(12) United States Patent
Yang et al.

(10) Patent No.: US 10,891,735 B2
(45) Date of Patent: Jan. 12, 2021

(54) GENERATION OF SYNTHETIC HIGH-ELEVATION DIGITAL IMAGES FROM TEMPORAL SEQUENCES OF HIGH-ELEVATION DIGITAL IMAGES

(71) Applicant: X Development LLC, Mountain View, CA (US)

(72) Inventors: Jie Yang, Sunnyvale, CA (US); Cheng-en Guo, Santa Clara, CA (US); Zhiqiang Yuan, San Jose, CA (US); Elliott Grant, Woodside, CA (US); Hongxu Ma, Albany, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 114 days.

(21) Appl. No.: 16/242,873

(22) Filed: Jan. 8, 2019

(65) Prior Publication Data
US 2020/0125822 A1 Apr. 23, 2020

Related U.S. Application Data

(60) Provisional application No. 62/748,296, filed on Oct. 19, 2018.

(51) Int. Cl.
*G06T 7/00* (2017.01)
*A01D 41/127* (2006.01)
(Continued)

(52) U.S. Cl.
CPC .......... *G06T 7/0016* (2013.01); *A01D 41/127* (2013.01); *G06K 9/0063* (2013.01);
(Continued)

(58) Field of Classification Search
CPC ......... G06T 7/0016; G06T 7/143; G06T 5/50; G06T 2207/10016; G06T 2207/10032;
(Continued)

(56) References Cited

U.S. PATENT DOCUMENTS 9,665,927 B2 5/2017 Ji et al.
2009/0232349 A1 9/2009 Moses et al.
(Continued)

FOREIGN PATENT DOCUMENTS

CN 107945146 4/2018

OTHER PUBLICATIONS

Li, L. et al. (2017). Super-resolution reconstruction of high-resolution satellite ZY-3 TLC images. Sensors, 17(5), 1062; 12 pages.
(Continued)

*Primary Examiner* — Michael R Neff
(74) *Attorney, Agent, or Firm* — Middleton Reutlinger

(57) ABSTRACT

Implementations relate to detecting/replacing transient obstructions from high-elevation digital images, and/or to fusing data from high-elevation digital images having different spatial, temporal, and/or spectral resolutions. In various implementations, first and second temporal sequences of high-elevation digital images capturing a geographic area may be obtained. These temporal sequences may have different spatial, temporal, and/or spectral resolutions (or frequencies). A mapping may be generated of the pixels of the high-elevation digital images of the second temporal sequence to respective sub-pixels of the first temporal sequence. A point in time at which a synthetic high-elevation digital image of the geographic area may be selected. The synthetic high-elevation digital image may be generated for the point in time based on the mapping and other data described herein.

20 Claims, 11 Drawing Sheets

(51) Int. Cl.
| | |
|---|---|
| G06K 9/00 | (2006.01) |
| G06T 5/50 | (2006.01) |
| G06T 7/143 | (2017.01) |
| G06N 3/04 | (2006.01) |
| G06N 3/08 | (2006.01) |
| G06Q 10/04 | (2012.01) |
| G06Q 50/02 | (2012.01) |

(52) U.S. Cl.
CPC ....... *G06K 9/00657* (2013.01); *G06N 3/0472* (2013.01); *G06N 3/08* (2013.01); *G06Q 10/04* (2013.01); *G06Q 50/02* (2013.01); *G06T 5/50* (2013.01); *G06T 7/143* (2017.01); *G06K 2009/00644* (2013.01); *G06T 2207/10016* (2013.01); *G06T 2207/10032* (2013.01); *G06T 2207/10048* (2013.01); *G06T 2207/20081* (2013.01); *G06T 2207/20084* (2013.01); *G06T 2207/20221* (2013.01); *G06T 2207/30181* (2013.01); *G06T 2207/30188* (2013.01)

(58) Field of Classification Search
CPC . G06T 2207/10048; G06T 2207/20081; G06T 2207/20084; G06T 2207/20221; G06T 2207/30181; G06T 2207/30188; A01D 41/127; G06K 9/0063; G06K 9/00657; G06K 2009/00644; G06N 3/0472; G06N 3/08; G06Q 10/04; G06Q 50/02
USPC ........................................................ 382/154
See application file for complete search history.

(56) References Cited

U.S. PATENT DOCUMENTS

| | | |
|---|---|---|
| 2014/0067745 A1 | 3/2014 | Avey et al. |
| 2015/0040473 A1 | 2/2015 | Lankford |
| 2016/0093212 A1 | 3/2016 | Barfield, Jr. et al. |
| 2016/0125331 A1 | 5/2016 | Vollmar et al. |
| 2016/0202227 A1 | 7/2016 | Mathur et al. |
| 2016/0223506 A1 | 8/2016 | Shriver et al. |
| 2016/0224703 A1 | 8/2016 | Shriver |
| 2016/0334276 A1 | 11/2016 | Pluvinage |
| 2017/0016870 A1 | 1/2017 | McPeek |
| 2017/0090068 A1 | 3/2017 | Xiang et al. |
| 2017/0235996 A1 | 8/2017 | Kwan |
| 2018/0035605 A1 | 2/2018 | Guan et al. |
| 2018/0146626 A1 | 5/2018 | Xu |
| 2018/0182068 A1 | 6/2018 | Kwan |
| 2018/0189564 A1 | 7/2018 | Freitag et al. |
| 2018/0211156 A1 | 7/2018 | Guan et al. |
| 2018/0218197 A1 | 8/2018 | Kwan |
| 2018/0253600 A1 | 9/2018 | Ganssle |

OTHER PUBLICATIONS

Sabini, M. et al. (2017). Understanding Satellite-Imagery-Based Crop Yield Predictions. Technical Report. Stanford University. http://cs231n.stanford.edu/reports/2017/pdfs/555.pdf [Accessed on Oct. 23, 2017]; 9 pages.

Huang, T. et al. (2010). Image super-resolution: Historical overview and future challenges. In Super-resolution imaging, CRC Press; pp. 19-52.

Smith, J. (2018). Using new satellite imagery sources and machine learning to predict crop types in challenging geographies; Building tools to help small-scale farmers connect to the global economy. https://medium.com/devseed/using-new-satellite-imagery-sources-and-machine-learning-to-predict-crop-types-in-challenging-4eb4c4437ffe. [retrieved Oct. 3, 2018]; 6 pages.

Gao, F. et al. (2006). On the blending of the Landsat and MODIS surface reflectance: Predicting daily Landsat surface reflectance. IEEE Transactions on Geoscience and Remote sensing, 44(8); pp. 2207-2218.

Zabala, S. (2017). Comparison of multi-temporal and multispectral Sentinel-2 and Unmanned Aerial Vehicle imagery for crop type mapping. Master of Science (MSc) Thesis, Lund University, Lund, Sweden; 73 pages.

Emelyanova, I. et al. (2012). On blending Landsat-MODIS surface reflectances in two landscapes with contrasting spectral, spatial and temporal dynamics; 83 pages.

Sublime, J. et al. (2017). Multi-scale analysis of very high resolution satellite images using unsupervised techniques. Remote Sensing, 9(5), 495; 20 pages.

Rao, V. et al. (2013). Robust high resolution image from the low resolution satellite image. In Proc. of Int. Conf. on Advances in Computer Science (AETACS); 8 pages.

Yang, C. et al. (2012). Using high-resolution airborne and satellite imagery to assess crop growth and yield variability for precision agriculture. Proceedings of the IEEE, 101(3), 582-592.

Barazzetti, L. et al. (2014). Automatic registration of multi-source medium resolution satellite data. International Archives of the Photogrammetry, Remote Sensing & Spatial Information Sciences; pp. 23-28.

Barazzetti, L. et al. (2014). Automatic co-registration of satellite time series via least squares adjustment. European Journal of Remote Sensing, 47(1); pp. 55-74.

Johnson, J. et al. (2016). Perceptual losses for real-time style transfer and super-resolution. Department of Computer Science, Stanford University; 18 pages.

Cheng, Q. et al. (2014). Cloud removal for remotely sensed images by similar pixel replacement guided with a spatio-temporal MRF model. ISPRS journal of photogrammetry and remote sensing, 92; pp. 54-68.

Lin, C. H. et al. (2012). Cloud removal from multitemporal satellite images using information cloning. IEEE transactions on geoscience and remote sensing, 51(1), 232-241.

Tseng, D. C. et al. (2008). Automatic cloud removal from multi-temporal SPOT images. Applied Mathematics and Computation, 205(2); pp. 584-600.

Luo, Y. et al. (2018). Stair: A generic and fully-automated method to fuse multiple sources of optical satellite data to generate a high-resolution, daily and cloud-/gap-free surface reflectance product. Remote Sensing of Environment, 214; pp. 87-99.

Hengl, T. et al. (2017) SoilGrids250m: Global gridded soil information based on machine learning. PLoS ONE 12(2): e0169748. doi:10.1371/journal.pone.0169748; 40 pages.

Mohanty, S. et al. (2016) Using Deep Learning for Image-Based Plant Disease Detection. Front. Plant Sci. 7:1419. doi: 10.3389/fpls.2016.01419; 10 pages.

Pantazi, X. et al. (2016). Wheat yield prediction using machine learning and advanced sensing techniques. Computers and Electronics in Agriculture, 121; pp. 57-65.

European Patent Office; International Search Report and Written Opinion issued in PCT application Ser. No. PCT/US2019/056882; 19 pages; dated Apr. 16, 2020.

Thanaphong, Phongpreecha (Joe), "Early Corn Yields Prediction Using Satellite Images;" retrieved from internet: https://tpjoe.gitlab.io/post/cropprediction/; 13 pages; Jul. 31, 2018.

European Patent Office; Invitation to Pay Additional Fees issued in Ser. No. PCT/US2019/056882; 19 pages; dated Jan. 29, 2020.

European Patent Office; International Search Report and Written Opinion of Ser. No. PCT/US2019/056883; 15 pages; dated Dec. 20, 2019.

Rao, J. et al., "Spatiotemporal Data Fusion Using Temporal High-Pass Modulation and Edge Primitives;" IEEE Transactions on Geoscience and Remote Sensing, vol. 53, No. 11; pp. 5853-5860; Nov. 1, 2015.

Zhang, L. et al., "An evaluation of monthly impervious surface dynamics by fusing Landsat and MODIS time series in the Pearl River Delta, China, from 2000 to 2015;" Remote Sensing of Environment, vol. 201, pp. 99-114, Nov. 1, 2017.

GENERATION OF SYNTHETIC HIGH-ELEVATION DIGITAL IMAGES FROM TEMPORAL SEQUENCES OF HIGH-ELEVATION DIGITAL IMAGES

BACKGROUND

Digital images captured from high elevations, such as satellite images, images captured by unmanned aerial vehicles, manned aircraft, or images captured by high elevation manned aircraft (e.g., space shuttles), are useful for a variety of remote sensing applications. For example, it is beneficial to observe crop fields over time for purposes of agricultural monitoring/planning. Other useful remote sensing applications of high-elevation digital imagery include, but are not limited to, city planning, reservoir monitoring, environmental monitoring, surveillance, reconnaissance, and so forth.

One challenge of high-elevation digital imagery is that 30-60% of such images tend to be covered by clouds, shadows, haze and/or snow (for simplicity, these will all be referred to herein as "transient obstructions"), depending on the location and time. Transient obstructions such as clouds make high-elevation digital images less useful, reduce their business and scientific value, and/or decrease the user experience with applications that rely on high-elevation digital images. For example, clouds introduce gaps in observations made during agricultural monitoring, potentially leaving key information such as crop vigor, crop tillage, and/or germination unavailable for use.

Additionally, the accuracy and reliability of these remote sensing applications are largely impacted by other factors such as observation resolutions. Preferably, a remote sensing based model operates on observations (e.g., high-elevation digital images) with high resolutions across temporal, spatial and spectral domains. For example, it is beneficial to have access to multi-spectrum, high-spatial-resolution (e.g. 10 m/pixel), high-elevation digital images of a location, which are captured as frequently as possible and are unobstructed by clouds. However, deploying a single airborne observation vehicle (e.g., satellite, manned aircraft, aerial drone, balloon, etc.) that captures observations with sufficiently high resolution in all three domains can be impractical for a variety of reasons, both technological and economic.

On the other hand, it has proven feasible to deploy multiple different airborne observation vehicles that capture digital images of the same geographic areas at different temporal, spatial, and/or spectral frequencies. For example, the moderate resolution imaging spectroradiometer ("MODIS") satellite deployed by the National Aeronautics and Space Administration ("NASA") captures high-elevation digital images at a relatively high temporal frequency (e.g., a given geographic area may be captured daily, or multiple times per week), but at relatively low spatial/spectral resolutions. By contrast, the Sentinel-2 satellite deployed by the European Space Agency ("ESA") captures high-elevation digital images at a relatively low temporal frequency (e.g., a given geographic area may only be captured once every few days or even weeks), but at relatively high spatial/spectral resolutions. High-elevation digital images generated by sources such as the MODIS and Sentinel-2 satellites may be aligned to the same geographic area based on global position system ("GPS") coordinates or other position coordinates associated with (e.g., added as annotations to) the high-elevation digital images.

SUMMARY

The present disclosure is generally directed to methods, apparatus, and computer-readable media (transitory and non-transitory) for transient obstruction removal from high-elevation digital images (e.g., satellite or drone images) and/or for fusing transient-obstruction-free digital images captured at different spatial, spectral, and/or temporal frequencies together to generate synthetic high-elevation digital images with relatively high resolutions across all three domains, e.g., using one or more scalable machine learning-based models. In some implementations, a first temporal sequence of high-elevation digital images of a geographic area (e.g., one or more farms) may be acquired at a first, relatively high temporal frequency (e.g., daily), e.g., by a first airborne observation vehicle. These high-elevation digital images may have relatively low spatial and/or spectral resolutions. Meanwhile, a second temporal sequence of high-elevation digital images of the geographic area may be captured at a second, relatively low temporal frequency (e.g., weekly, monthly, quarterly), e.g., by a different airborne observation vehicle. High-elevation digital images of the second temporal sequence may have higher spatial and/or spectral resolutions than high-elevation digital images of the first temporal sequence. In various implementations, the relatively high temporal frequency images of the first temporal sequence may be leveraged to generate synthetic high-elevation digital images with spectral and/or spatial resolutions that match (or at least approach) those of the second temporal sequence of high-elevation digital images. In some implementations, more than two temporal sequences of high-elevation digital images, such as temporal sequences acquired by three or more different airborne vehicles, may be used to generate synthetic high-elevation digital images. In some such implementations, accuracy may be increased, e.g., due to more temporal sequences providing more ground truth data.

In some implementations, a mapping may be generated between pixels of the first and second temporal sequences, and more particularly, to their underlying geographic units. For example, in some implementations, a mapping may be generated that maps pixels of the high-elevation digital images of the second temporal sequence to respective sub-pixels of the first temporal sequence. The mapping may be based, for instance, on spatial alignment of one plurality of geographic units that underlie the pixels of the second temporal sequence with portions of another plurality of geographic units that underlie the respective sub-pixels of the first temporal sequence. As an example, digital images of the first temporal sequence may have pixels with a spatial resolution of, say, 250-500 m/pixel. By contrast, digital images of the second temporal sequence may have pixels with a spatial resolution of, for instance, 10 m/pixel. In some implementations, the lower resolution pixels may be subdivided into "sub-pixels" that are spatially aligned (i.e. mapped) to geographic units that underlie the higher resolution pixels of the second temporal sequence.

A synthetic high-elevation digital image may be generated for any point in time at which a real (or "ground truth") digital image from the second temporal sequence is not available (or is irretrievably obstructed by clouds) and is desired. Once the point in time is selected for generation of the synthetic high-elevation digital image, the high-elevation digital image from the first temporal sequence that was captured in closest temporal proximity to the point in time may be selected as what will be referred to herein as a "low-resolution reference digital image." Pixel sub-band values from this low-resolution reference digital image may be leveraged to predict (e.g., estimate, interpolate, calculate) corresponding pixel sub-band values for the synthetic high-elevation digital image.

In various implementations, the synthetic high-elevation digital image may be generated based on a deviation of the low-resolution reference digital image (which represents ground truth) from a prediction of the state of the underlying terrain based on other high-elevation digital images of the first temporal sequence. For example, in some implementations, a first deviation associated with the low resolution reference digital image may be determined. The first deviation may represent a difference between ground-truth data forming the low-resolution reference digital image and corresponding data interpolated (e.g., using linear interpolation) for the point in time from the first temporal sequence of high-elevation digital images may be determined. Based on the first deviation, a second deviation may be predicted. The second deviation may represent a predicted or estimated difference between data forming the synthetic high-elevation digital image and corresponding data interpolated for the point in time from the second temporal sequence of high-elevation digital images. This second deviation may be used to generate the synthetic high-elevation digital image.

In some implementations, cluster analysis, such as K-means clustering, may be performed to identify pixel clusters in the second temporal sequence of high-elevation digital images. In some implementations, pixels having comparable "spectral-temporal traces" across the second temporal sequence of high-elevation digital images may be grouped together in a pixel cluster. As used herein, a "spectral-temporal trace" of a pixel refers to a temporal sequence of spectral values (e.g., sub-band values) of the pixel across a temporal sequence of high-elevation digital images. A particular pixel may have a different value for a given spectral sub-band in each high-elevation digital image across a temporal sequence of high-elevation digital images. However, other pixels may have similar sub-band values as the particular pixel in each of the temporal sequence, and hence may be clustered with the particular pixel. In some implementations, a centroid (e.g., average) may be generated for each pixel cluster. In some such implementations, a difference or deviation (e.g., "$\Delta$") between a pixel's actual sub-band value and the centroid value may be determined. These $\Delta$s may be used later to calculate individual sub-band values of pixels of the synthetic high-elevation digital image.

In some implementations, the pixel clusters and/or data generated from the clusters (e.g., centroids) may be used for transient obstruction removal as well. For example, suppose a portion of a given high-elevation digital image depicts a cloud, which obstructs the ground beneath it. Spectral values of pixels obstructed by the cloud may be inferred based on spectral values of other, unobstructed pixels of the same high-elevation digital image that belong to the same pixel cluster. Thus, in some implementations, clouds may be identified (e.g., a cloud mask may be identified) in high-elevation digital images of the first temporal sequence. Pixels depicting the clouds may be replaced with pixel values that predict a state of the underlying terrain. This prediction may be based on for example, the pixel clusters of which the cloud-obstructed pixels are members.

Techniques described herein may be applied in many applications, including but not limited to agriculture (e.g., crop analysis, crop prediction), environment monitoring, disaster control, and so forth. Techniques described herein also give rise to various technical advantages. For example, conventional techniques for fusing together high-elevation digital images rely on pixel-by-pixel computations. This may not be scalable for large-scale remote sensing applications such as crop analysis and/or prediction for large numbers of individual farming interests. By contrast, techniques described herein are far more efficient, facilitating more frequent and/or prolific remote sensing applications. For example, once the aforementioned pixel clusters are identified (e.g., for a time interval such as a year, or a growing season, which is also referred to herein as a "crop year"), they can be applied relatively quickly and prolifically because their application requires less computing resources (e.g., memory, CPU cycles) and time than conventional techniques.

Techniques are also described herein for detecting and removing noise caused by transient obstructions such as clouds from high-elevation digital images of geographic areas, and for predicting/estimating ground features and/or terrain obstructed by transient obstructions. In various implementations, high-elevation digital image pixel data acquired across multiple domains, such as the temporal domain (i.e., multiple digital images captured over time), the spatial domain, and/or the spectral domain (e.g., RGB, infrared, etc.), may be used to predict or estimate data that can be used to replace pixels that depict transient obstructions such as clouds.

In some implementations, patterns, or "fingerprints," or "traces" within individual domains and/or across multiple domains may be established for individual geographic units. These fingerprints/traces may be used to identify other geographic units that would most likely have similar appearances in a digital image, assuming those other geographic units are not obscured by clouds. As an example, suppose a particular geographic unit is obscured by clouds in a given high-elevation digital image. An unobscured geographic unit in the same digital image or another related digital image (e.g., taken nearby, taken within the same time interval, taken of the same type of crop, etc.) that matches one or more domain fingerprints of the particular geographic unit may be used to predict/estimate data that is usable to replace the obscured pixel.

As used herein, a domain fingerprint of one geographic unit "matches" (or is "comparable to") a domain fingerprint of another geographic unit when, for example, a similarity measure between the two fingerprints satisfies some threshold, and/or when a Euclidean distance between latent embeddings of the fingerprints satisfies some criterion. Thus, it should be understood that the term "match" as used herein with regard to domain fingerprints or spectral-temporal traces is not limited to exact equality. As another example, two domain fingerprints or traces may match when, for instance, they both can be fitted statistically with the same curve, or when they are used to generate curves that fit each other statistically.

High-elevation digital images are often taken of a geographic area over time. For example, many satellites capture multiple temporally-distinct digital images of the same underlying geographic area as they repeatedly travel along their orbital trajectories. Due to the transient nature of clouds and other transient obstructions, each digital image of the particular geographic region may have different areas that are obscured or unobscured by natural obstructions such as clouds. Some implementations described herein leverage these multi-temporal images to predict values of obscured pixels in individual digital images.

For example, in some implementations, a three-dimensional ("3D") array structure may be assembled in memory for a geographic area based on multiple digital images captured of the geographic area. Each row of the 3D array may represent a particular pixel (and spatially corresponding geographic unit). Each column of the array may correspond to, for instance, a different digital image captured at a different time (e.g., during each orbit of a satellite). And in some implementations, each unit in the third dimension of the 3D array—which can be referred to alternatively as "layers," "pages," and/or "aisles"—may correspond to a different spectral frequency, such as red, green, blue, near infrared ("IR"), mid-IR, far-IR, thermal IR, microwave, and/or radar.

Once this 3D array is assembled for a particular geographic area, it can be used to remove transient obstructions such as clouds from individual digital images. For example, in some implementations, clouds or other noise may leave "gaps" in one or more "cells" of the 3D array. The 3D array can be applied as input to one or more statistical models so that the gaps can be filled with replacement data, e.g., from other cells of the 3D array. In some such implementations, the 3D array structure may continue to grow as more digital images are captured over time. Consequently, the ability to fill in the gaps and replace clouds with predicted terrain data may be enhanced over time.

Various approaches can be applied to determine whether cells of the 3D array structure represent transient obstructions (or other noise). In some implementations, existing/known masks associated with clouds, haze, snow, shadows, etc. may be packaged with high-elevation digital images. Additionally or alternatively, in some implementations, an artificial intelligence model may be trained to detect clouds—in some cases it may be tuned to be high recall so that, for instance, it is unlikely to miss potential clouds. Additionally or alternatively, in some implementations, one or more models (e.g., two models) may be trained to perform both cloud detection and removal. For example, a model may be trained to, based on an input high-elevation digital image, predict a cloud mask and remove the clouds.

In some implementations, recurrent neural networks or other memory networks (e.g., long short-term memory, or "LSTM") that are able to account for multi-temporal input may be used to fill in the gaps in the 3D array structure. For example, in some implementations, each spatio-spectral "slice" of the 3D array structure (i.e., data extracted from each digital image of multiple digital images captured over time) may be applied as input across a recurrent neural network to generate output. This output may be combined (e.g., concatenated) with a "next" slice of the 3D array structure and applied as input across the same recurrent neural network to generate additional output. This may continue across a whole temporal sequence of digital images captured of a geographic area. At each turn, the output may "predict" what the next slice will look like. When the next slice in actuality includes transient obstruction(s) such as clouds, the predicted output can be used to generate replacement data for the pixels that portray the transient obstruction(s).

In some implementations, the domain fingerprints and/or spectral-temporal traces described previously may be used to classify individual geographic units into particular terrain classifications. These terrain classifications may include, for instance, roadways, buildings, water, vegetation, etc. In some implementations, e.g., in which disclosed techniques are used for agricultural monitoring, terrain classifications may include ground features such as different types of crops (e.g., "corn," "soybeans," etc.), and may be as granular as desired. For example, in some implementations, the Cropland Data Layer ("CDL") released by the United States Department of Agriculture ("USDA") and/or the "Land Cover" dataset made available by some governments and/or universities may be used to establish terrain classifications associated with different crop types. In some implementations, geographic units may be classified into terrain classifications using a trained machine learning model, such as various flavors of artificial neural networks (e.g., convolutional, recurrent, etc.). In some implementations, two or more geographic units may "match" if they share a particular terrain classification.

A variety of different machine learning model types may be trained and used for a variety of different purposes in the present disclosure. In some implementations, one or more generative adversarial networks ("GANs") may be used to facilitate unsupervised machine learning for various aspects of the present disclosure. For example, in some implementations, synthetic transient obstructions such as clouds (and shadows they cast on the ground) may be added to otherwise obstruction-free ground truth high-elevation digital images. These 37 synthetic images may then be used, e.g., along with the original unaltered high-elevation digital images, as training data for a GAN that includes a generator model and a discriminator model. The generator model may be used to generate synthetic images (i.e., with synthetic transient obstructions), which are then applied as input across the discriminator model to generate output comprising a best "guess" as to whether the input digital image(s) are "real" or "synthetic." The input for the discriminator model may be labeled as "real" or "synthetic," so that these labels may be compared to its output to determine error. This error may then be used to train both the discriminator model and the generator model, so that over time the generator model generates synthetic images that are more likely to "fool" the discriminator model, while the discriminator model improves at accurately guessing whether an image is "real" or "synthetic."

Similarly, transient obstructions such as clouds may be removed/replaced in high-elevation digital imagery using another GAN that also includes a generator model and a discriminator model. High-elevation digital image(s) with transient obstruction(s) may be applied as input across the generator model to generate output in the form of synthetic, obstruction-free digital image(s). The synthetic, obstruction-free digital image(s) may then be applied as input across the discriminator model, along with obstruction-free ground truth high-elevation digital images, to generate output comprising a best "guess" as to whether the digital image(s) are "real" or "synthetic." As described previously, the inputs for the discriminator model may be labeled as "real" or "synthetic," and these labels may be compared to its output to determine error. This error may then be used to train both the discriminator model and the generator model, so that over time the generator model generates synthetic, obstruction-free images that are more likely to "fool" the discriminator model, while the discriminator model improves at accurately guessing whether an image is "real" or "synthetic."

In some implementations, a computer implemented method may be provided that includes: obtaining first and second temporal sequences of high-elevation digital images. In various implementations, the first temporal sequence of high-elevation digital images may capture a geographic area at a first temporal frequency. Each high-elevation digital image of the first temporal sequence may include a plurality of pixels that align spatially with a respective first plurality of geographic units of the geographic area. Each high-elevation digital image of the first temporal sequence may be captured at a first spatial resolution. The second temporal sequence of high-elevation digital images may capture the geographic area at a second temporal frequency that is less than the first temporal frequency. Each high-elevation digital image of the second temporal sequence may include a plurality of pixels that align spatially with a second plurality of geographic units of the geographic area. Each high-elevation digital image of the second temporal sequence may be captured at a second spatial resolution that is greater than the first spatial resolution.

The method may further include generating a mapping of the pixels of the high-elevation digital images of the second temporal sequence to respective sub-pixels of the first temporal sequence. In various implementations, the mapping may be based on spatial alignment of the geographic units of the second plurality of geographic units that underlie the pixels of the second temporal sequence with portions of the geographic units of the first plurality of geographic units that underlie the respective sub-pixels.

In various implementations, the method may further include selecting a point in time for which a synthetic high-elevation digital image of the geographic area at the second spatial resolution will be generated; selecting, as a low-resolution reference digital image, the high-elevation digital image from the first temporal sequence that was captured in closest temporal proximity to the point in time; determining a first deviation of ground-truth data forming the low-resolution reference digital image from corresponding data interpolated for the point in time from the first temporal sequence of high-elevation digital images; predicting, based on the first deviation, a second deviation of data forming the synthetic high-elevation digital image from corresponding data interpolated for the point in time from the second temporal sequence of high-elevation digital images; and generating the synthetic high-elevation digital image based on the mapping and the predicted second deviation.

This method and other implementations of technology disclosed herein may each optionally include one or more of the following features.

In various implementations, the method may further include: identifying, across the high-elevation digital images of the second temporal sequence, a plurality of pixel clusters of the second temporal sequence. Each pixel cluster of the plurality of pixel clusters may include pixels with comparable spectral-temporal traces across the second temporal sequence of high-elevation digital images. The corresponding data interpolated from the second temporal sequence may include one or more centroids calculated from one or more of the pixel clusters. In various implementations, the identifying may include performing K-means clustering on the pixels of the second temporal sequence of high-elevation digital images. In various implementations, each sub-band value of each synthetic pixel of the synthetic high-elevation digital image may be calculated based on a deviation of that pixel from a centroid of a pixel cluster that contains that pixel.

In various implementations, the second deviation may be proportionate to the first deviation. In various implementations, the generating may include interpolating a spectral sub-band of the pixels of the synthetic high-elevation digital image. The spectral sub-band may exist in the pixels of the second temporal sequence of high-elevation digital images and may be missing from the pixels of the first temporal sequence of high-elevation digital images. In various implementations, the spectral sub-band is near infrared or another spectral sub-band that is present in one temporal sequence and missing from the other.

In various implementations, the generating may be further based on a difference between a first elevation at which one or more digital images of the first temporal sequence was taken and a second elevation at which one or more digital images of the second temporal sequence was taken. In various implementations, the method may further include selecting, from the second temporal sequence, first and second high-resolution anchor digital images captured prior to and after, respectively, the point in time. In various implementations, the corresponding interpolated data calculated for the point in time from the second temporal sequence may be calculated based on the first and second high-resolution anchor digital images. In various implementations, the method may further include selecting, as first and second low-resolution anchor digital images, the two high-elevation digital images from the first temporal sequence that were captured in closest temporal proximity to, respectively, the first and second high-resolution anchor digital images. In some such implementations, the corresponding interpolated data calculated from the first temporal sequence of high-elevation images may be calculated based on the first and second low-resolution anchor images.

In various implementations, the first temporal sequence of high-elevation digital images may be captured by a satellite. In various implementations, the second temporal sequence of high-elevation digital images may be captured by a satellite and/or by an aerial drone.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
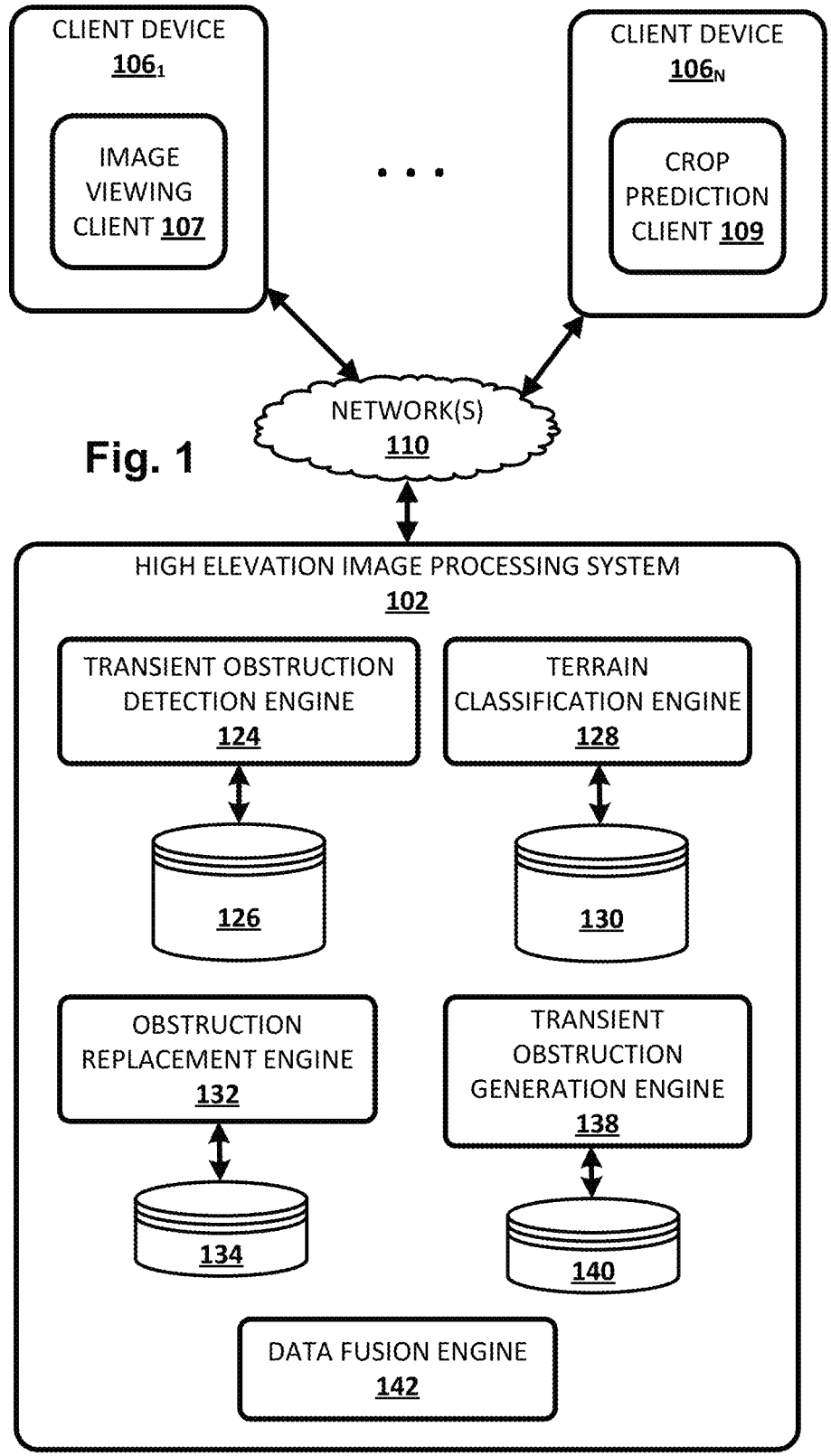
FIG. 1 illustrates an example environment in selected aspects of the present disclosure may be implemented, in accordance with various implementations.

FIG. 1 illustrates an environment in which one or more selected aspects of the present disclosure may be implemented, in accordance with various implementations. The example environment includes a plurality of client devices $106_{1-N}$ and a high elevation digital image processing system 102. High elevation digital image processing system 102 may be implemented in one or more computers that communicate, for example, through a network. High elevation digital image processing system 102 is an example of an information retrieval system in which the systems, components, and techniques described herein may be implemented and/or with which systems, components, and techniques described herein may interface.

A user may interact with high elevation digital image processing system 102 via a client device 106. Each client device 106 may be a computer coupled to the high elevation digital image processing system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus of the participant that includes a computing device (e.g., a watch of the participant having a computing device, glasses of the participant having a computing device). Additional and/or alternative client devices may be provided.

Each of client device 106 and high elevation digital image processing system 102 may include one or more memories for storage of data and software applications, one or more processors for accessing data and executing applications, and other components that facilitate communication over a network. The operations performed by client device 106 and/or high elevation digital image processing system 102 may be distributed across multiple computer systems. High elevation digital image processing system 102 may be implemented as, for example, computer programs running on one or more computers in one or more locations that are coupled to each other through a network.

Each client device 106 may operate a variety of different applications that may be used, for instance, to view high-elevation digital images that are processed using techniques described herein to remove transient obstructions such as clouds, shadows (e.g., cast by clouds), snow, manmade items (e.g., tarps draped over crops), etc. For example, a first client device $106_1$ operates an image viewing client 107 (e.g., which may be standalone or part of another application, such as part of a web browser). Another client device 106N may operate a crop prediction application 109 that utilizes high-elevation digital images processed using techniques described herein to make various agricultural predictions and/or recommendations.

In various implementations, high elevation digital image processing system 102 may include a transient obstruction detection engine 124, a terrain classification engine 128, an obstruction replacement engine 132, a transient obstruction generation engine 138, and/or a data fusion engine 142. In some implementations one or more of engines 124, 128, 132, 138, and/or 142 may be omitted. In some implementations all or aspects of one or more of engines 124, 128, 132, 138, and/or 142 may be combined. In some implementations, one or more of engines 124, 128, 132, 138, and/or 142 may be implemented in a component that is separate from high elevation digital image processing system 102. In some implementations, one or more of engines 124, 128, 132, 138, and/or 142, or any operative portion thereof, may be implemented in a component that is executed by client device 106.

Transient obstruction detection engine 124 may be configured to detect, in high-elevation digital images, transient obstructions such as clouds, shadows cast by clouds, rain, haze, snow, flooding, and/or manmade obstructions such as tarps, etc. Transient obstruction detection engine 124 may employ a variety of different techniques to detect transient obstructions. For example, to detect clouds (e.g., create a cloud mask), transient obstruction detection engine 124 may use spectral and/or spatial techniques. In some implementations, one or more machine learning models may be trained and stored, e.g., in index 126, and used to identify transient obstructions. For example, in some implementations, one or more deep convolutional neural networks known as "U-nets" may be employed. U-nets are trained to segment images in various ways, and in the context of the present disclosure may be used to segment high elevation digital images into segments that include transient obstructions such as clouds. Additionally or alternatively, in various implementations, other known spectral and/or spatial cloud detection techniques may be employed, including techniques that either use, or don't use, thermal infrared spectral bands.

In some implementations, terrain classification engine 128 may be configured to classify individual pixels, or individual geographic units that correspond spatially with the individual pixels, into one or more "terrain classifications." Terrain classifications may be used to label pixels by what they depict. Non-limiting examples of terrain classifications include but are not limited to "buildings," "roads," "water," "forest," "crops," "vegetation," "sand," "ice," "mountain," "tilled soil," and so forth. Terrain classifications may be as coarse or granular as desired for a particular application. For example, for agricultural monitoring it may be desirable to have numerous different terrain classifications for different types of crops. For city planning it may be desirable to have numerous different terrain classifications for different types of buildings, roofs, streets, parking lots, parks, etc.

Terrain classification engine 128 may employ a variety of different known techniques to classify individual geographic units into various terrain classifications. Some techniques may utilize supervised or unsupervised machine learning that includes trained machine learning models stored, for instance, in index 130. These techniques may include but are not limited to application of multivariate statistics to local relief gradients, fuzzy k-means, morphometric parameterization and artificial neural networks, and so forth. Other techniques may not utilize machine learning.

In some implementations, terrain classification engine 128 may classify individual geographic units with terrain classifications based on traces or fingerprints of various domain values over time. For example, in some implementations, terrain classification engine 128 may determine, across pixels of a corpus of digital images captured over time, spectral-temporal data fingerprints or traces of the individual geographic units corresponding to each individual pixel. Each fingerprint may include, for instance, a sequence of values within a particular spectral domain across a temporal sequence of digital images (e.g., a feature vector of spectral values).

As an example, suppose a particular geographic unit includes at least a portion of a deciduous tree. In a temporal sequence of satellite images of the geographic area that depict this tree, the pixel(s) associated with the particular geographic unit in the visible spectrum (e.g., RGB) will sequentially have different values as time progresses, with spring and summertime values being more green, autumn values possibly being orange or yellow, and winter values being gray, brown, etc. Other geographic units that also include similar deciduous trees may also exhibit similar domain traces or fingerprints. Accordingly, in various implementations, the particular geographic unit and/or other similar geographic units may be classified, e.g., by terrain classification engine 128, as having a terrain classification such as "deciduous," "vegetation," etc., based on their matching spectral-temporal data fingerprints.

Obstruction replacement engine 132 may be configured to generate obstruction-free versions of digital images in which those pixels that depict clouds, snow, or other transient obstructions are replaced with replacement data that estimates/predicts the actual terrain that underlies these pixels. Obstruction replacement engine 132 may use a variety of different techniques to generate transient-obstruction-free versions of digital images.

For example, in some implementations, obstruction replacement engine 132 may be configured to determine, e.g., based on output provided by transient obstruction detection engine 124, one or more obscured pixels of a high-elevation digital image that align spatially with one or more obscured geographic units of the geographic area that are obscured in the digital image by one or more transient obstructions. Obstruction replacement engine 132 may then determine, e.g., across pixels of a corpus of digital images that align spatially with the one or more obscured geographic units, one or more spectral-temporal data fingerprints of the one or more obscured geographic units. For example, in some implementations, terrain classification engine 128 may classify two or more geographic units having matching spectral-temporal fingerprints into the same terrain classification.

Obstruction replacement engine 132 may then identify one or more unobscured pixels of the same high-elevation digital image, or of a different high elevation digital image that align spatially with one or more unobscured geographic units that are unobscured by transient obstructions. In various implementations, the unobscured geographic units may be identified because they have spectral-temporal data fingerprints that match the one or more spectral-temporal data fingerprints of the one or more obscured geographic units. For example, obstruction replacement engine 132 may seek out other pixels of the same digital image or another digital image that correspond to geographic units having the same (or sufficiently similar) terrain classifications.

In various implementations, obstruction replacement engine 132 may calculate or "harvest" replacement pixel data based on the one or more unobscured pixels. For example, obstruction replacement engine may take an average of all values of the one or more unobscured pixels in a particular spectrum and use that value in the obscured pixel. By performing similar operations on each obscured pixel in the high-elevation digital, obstruction replacement engine 132 may be able to generate a transient-obstruction-free version of the digital image in which data associated with obscured pixels is replaced with replacement pixel data calculated based on other, unobscured pixels that depict similar terrain (e.g., same terrain classification, matching spectral-temporal fingerprints, etc.).

In some implementations, obstruction replacement engine 132 may employ one or more trained machine learning models that are stored in one or more indexes 134 to generate obstruction-free versions of digital images. A variety of different types of machine learning models may be employed. For example, in some implementations, collaborative filtering and/or matrix factorization may be employed, e.g., to replace pixels depicting transient obstructions with pixel data generated from other similar-yet-unobscured pixels, similar to what was described previously. In some implementations, matrix factorization techniques such as the following equation may be employed:

$$\hat{r}_{ui} = \mu + b_i + b_u + q_i^T p_u$$

wherein r represents the value of a pixel in a particular band if it were not covered by clouds, μ represents global average value in the same band, b represents the systematic bias, i and u represent the pixel's id and timestamp, T represents matrix transpose, and q and p represent the low-dimension semantic vectors (or sometimes called "embeddings"). In some implementations, temporal dynamics may be employed, e.g., using an equation such as the following:

$$\hat{r}_{ui}(t) = \mu + b_i(t) + b_u(t) + q_i^T p_u(t)$$

wherein t represents a non-zero integer corresponding to a unit of time. Additionally or alternatively, in some implementations, generative adversarial networks, or "GANs," may be employed, e.g., by obstruction replacement engine 132, in order to train one or more models stored in index 134. A more detailed description of how GANs may be used in this manner is provided with regard to FIG. 3.

In some implementations, a transient obstruction generation engine 138 may be provided that is configured to generate synthetic obstructions such as clouds, snow, etc. that may be incorporated into digital images (e.g., used to augment, alter, and/or replace pixel values in one or more spectrums) for a variety of different purposes. In some implementations, digital images with baked-in synthetic transient obstructions may be used as training data to train one or more machine learning models used by other components of high elevation digital image processing system 102.

For example, in some implementations, a machine learning model employed by obstruction replacement engine 132 and stored in index 134 may be trained as follows. An obstruction-free (e.g., cloudless) high-elevation digital image of a geographic area may be retrieved. Based on the obstruction-free digital image, transient obstruction generation engine 138 may generate, e.g., using one or trained more machine learning models described below, a training example that includes the obstruction-free image with baked in synthetic transient obstructions such as clouds. This training example may be applied, e.g., by obstruction replacement engine 132, as input across one or more machine learning models stored in index 134 to generate output. The output may be compared to the original obstruction-free digital image to determine a difference or error. This error may be used to perform operations such as back propagation and/or gradient descent to train the machine learning model to remove transient obstructions such as clouds and replace them with predicted terrain data.

As another example, in some implementations, a machine learning model employed by transient obstruction detection engine 124 and stored in index 126 may be trained as follows. An obstruction-free (e.g., cloudless) high-elevation digital image of a geographic area may be retrieved. Based on the obstruction-free digital image, transient obstruction generation engine 138 may generate, e.g., using one or trained more machine learning models described below, a training example that includes the obstruction-free image with baked-in synthetic transient obstructions such as clouds. The location of the synthetic transient obstruction will be known because it is synthetic, and thus is available, e.g., from transient obstruction generation engine 138. Accordingly, in various implementations, the training example may be labeled with the known location(s) (e.g., pixels) of the synthetic transient obstruction. The training example may then be applied, e.g., by transient obstruction detection engine 124, as input across one or more machine learning models stored in index 134 to generate output indicative of, for instance, a cloud mask. The output may be compared to the known synthetic transient obstruction location(s) to determine a difference or error. This error may be used to perform operations such as back propagation and/or gradient descent to train the machine learning model to generate more accurate cloud masks.

Transient obstruction generation engine 138 may use a variety of different techniques to generate synthetic transient obstructions such as clouds. For example, in various implementations, transient obstruction generation engine 138 may use particle systems, voxel models, procedural solid noise techniques, frequency models (e.g., low albedo, single scattering approximation for illumination in a uniform medium), ray trace volume data, textured ellipsoids, isotropic single scattering approximation, Perlin noise with alpha blending, and so forth. In some implementations, transient obstruction generation engine 138 may use GANs to generate synthetic clouds, or at least to improve generation of synthetic clouds. More details about such an implementation are provided with regard to FIG. 4. Transient obstruction generation engine 138 may be configured to add synthetic transient obstructions to one or more multiple different spectral bands of a high-elevation digital image. For example, in some implementations transient obstruction generation engine 138 may add clouds not only to RGB spectral band(s), but also to NIR spectral band(s).

Data fusion engine 142 may be configured to generate synthetic high-elevation digital images by fusing data from high-elevation digital images of disparate spatial, temporal, and/or spectral frequencies. For example, in some implementations, data fusion engine 142 may be configured to analyze MODIS and Sentinel-2 data to generate synthetic high-elevation digital images that have spatial and/or spectral resolutions approaching or matching those of images natively generated by Sentinel-2 based at least in part on data from images natively generated by MODIS. FIGS. 7A-D, 8, 9A-D, and 10, as well as the accompanying disclosure, will demonstrate operation of data fusion engine 142.

In this specification, the term "database" and "index" will be used broadly to refer to any collection of data. The data of the database and/or the index does not need to be structured in any particular way and it can be stored on storage devices in one or more geographic locations. Thus, for example, the indices 126, 130, 134, and 140 may include multiple collections of data, each of which may be organized and accessed differently.

Figure 2:
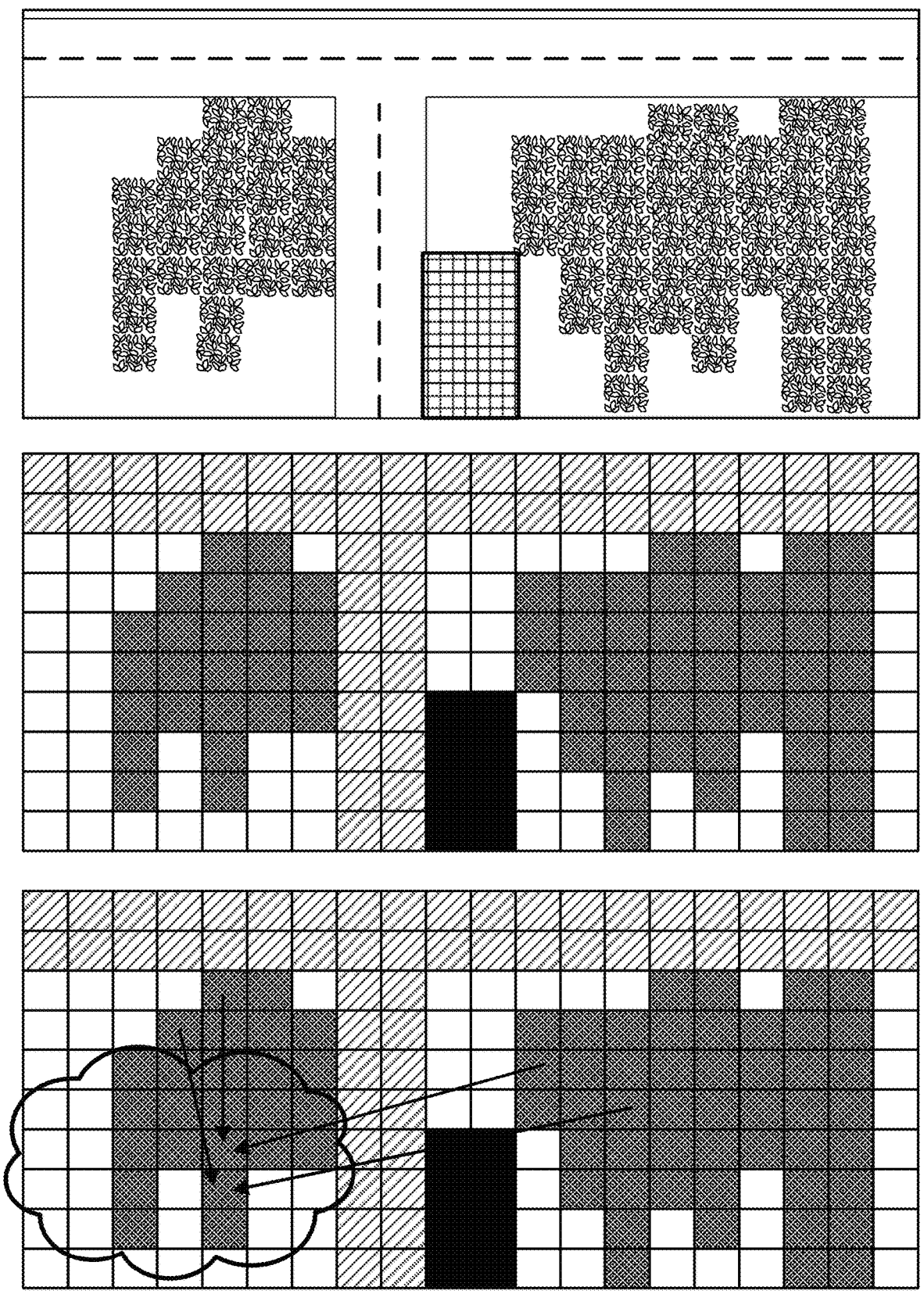
FIG. 2 depicts an example of how geographic units may be classified into terrain classifications, and how those terrain classifications can be used to generate replacement data for obscured pixels, in accordance with various implementations.

FIG. 2 depicts an example of how a ground truth high-elevation digital image (top) may be processed to classify the constituent geographic units that correspond to its pixels. In the top image, which schematically represents a high elevation digital image capturing a geographic area, a T-shaped road is visible that divides two plots of land at bottom left and bottom right. The bottom left plot of land includes a cluster of vegetation, and so does the bottom right plot. The bottom right plot also features a building represented by the rectangle with cross hatching.

The middle image demonstrates how the digital image at top may be classified, e.g., by terrain classification engine 128, into discrete terrain classifications, e.g., based on geographic units that share spectral-temporal fingerprints. The middle image is subdivided into squares that each represent a pixel that aligns spatially with a geographic unit of the top digital image. Pixels that depict roadway have been classified accordingly and are shown in a first shading. Pixels that depict the building have also been classified accordingly and are shown in black. Pixels that represent the vegetation in the bottom left and bottom right plots of land are also classified accordingly in a second shading that is slightly darker than the first shading.

The bottom image demonstrates how techniques described herein, particularly those relating to terrain classification and/or spectral-temporal fingerprint similarity, may be employed to generate replacement data that predicts/estimates terrain underlying a transient obstruction in a high elevation digital image. In the bottom images of FIG. 2, a cloud has been depicted schematically primarily over the bottom left plot of land. As indicated by the arrows, two of the vegetation pixels (five columns from the left, three and four rows from bottom, respectively) that are obscured by the cloud can be replaced with data harvested from other, unobscured pixels. For example, data associated with the obscured pixel five columns from the left and three rows from bottom is replaced with replacement data that is generated from two other unobscured pixels: the pixel four columns from left and four rows from top, and the pixel in the bottom right plot of land that is five rows from bottom, seven columns from the right. Data associated with the obscured pixel five columns from the left and four rows from bottom is replaced with replacement data that is generated from two other unobscured pixels: the pixel five columns from left and three rows from top, and the pixel in the bottom right plot of land that is five rows from top and nine columns from the right.

Of course these are just examples. More or less unobscured pixels may be used to generate replacement data for obscured pixels. Moreover, it is not necessary that the unobscured pixels that are harvested for replacement data be in the same digital image as the obscured pixels. It is often (but not always) the case that the unobscured pixels may be contained in another high elevation digital image that is captured nearby, for instance, with some predetermined distance (e.g., within 90 kilometers). Or, if geographic units that are far away from each other nonetheless have domain fingerprints that are sufficiently similar, those faraway geographic units may be used to harvest replacement data.

Figure 3:
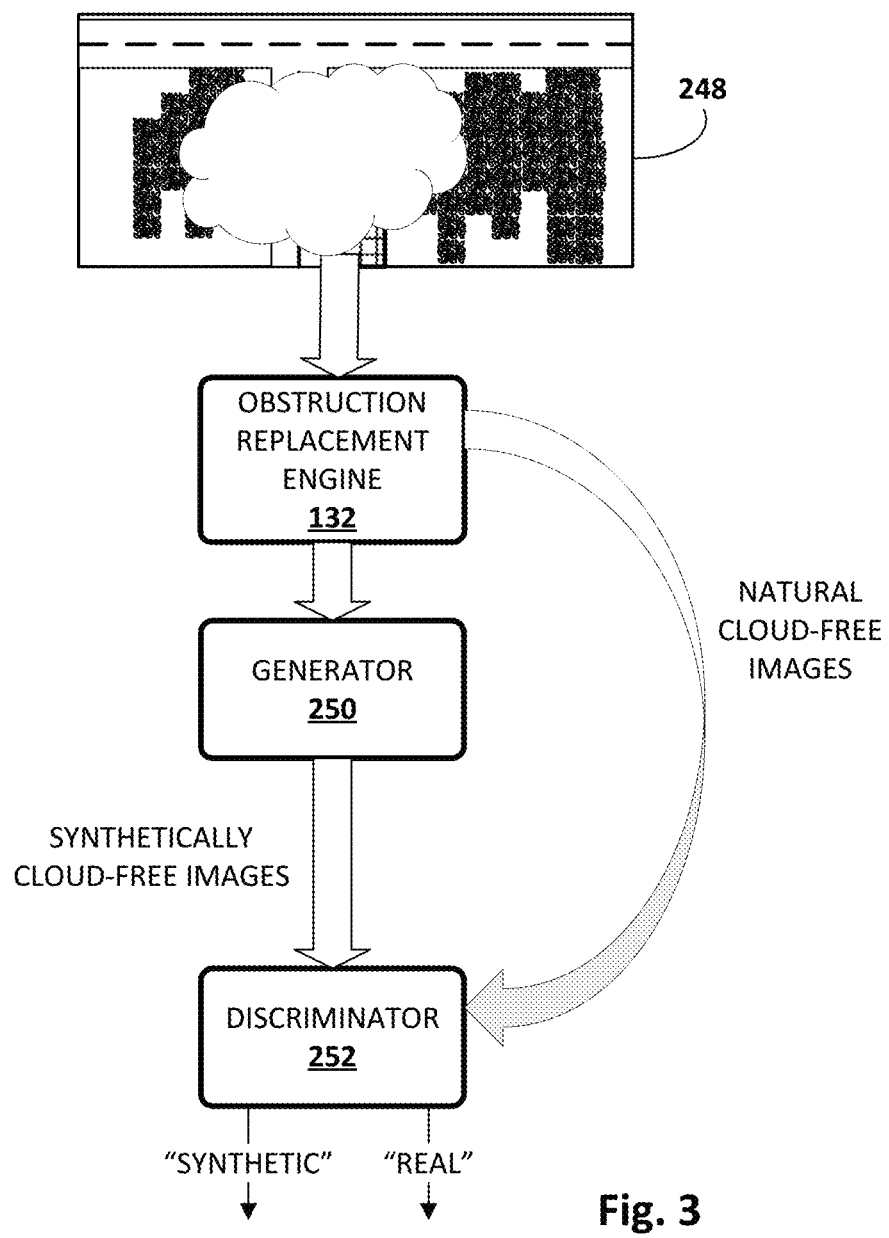
FIG. 3 depicts one example of how generative adversarial networks can be used to generate obstruction-free high-elevation digital images.

FIG. 3 depicts an example of how GANs may be used to train a generator model 250 employed by obstruction replacement engine 132, in accordance with various implementations. In various implementations, obstruction replacement engine 132 may retrieve one or more high elevation digital images 248 and apply them as input across generator model 250. Generator model 250 may take various forms, such as an artificial neural network. In some implementations, generator model 250 may take the form of a convolutional neural network.

Generator model 250 may generate output in the form of synthetically cloud-free (or more generally, transient obstruction-free) images. These images may then be applied as input across a discriminator model 252. Discriminator model 252 typically will take the same form as generator model 250, and thus can take the form of, for instance, a convolutional neural network. In some implementations, discriminator model 252 may generate binary output that comprises a "best guess" of whether the input was "synthetic" or "natural" (i.e., ground truth). At the same time, one or more natural, cloud-free (or more generally, transient obstruction-free) images (i.e., ground truth images) may also be applied as input across discriminator model 252 to generate similar output. Thus, discriminator model 252 is configured to analyze input images and make a best "guess" as to whether the input image contains synthetic data (e.g., synthetically-added clouds) or represents authentic ground truth data.

In various implementations, discriminator model 252 and generator model 250 may be trained in tandem, e.g., in an unsupervised manner. Output from discriminator model 252 may be compared to a truth about the input image (e.g., a label that indicates whether the input image was synthesized by generator 250 or is ground truth data). Any difference between the label and the output of discriminator model 252 may be used to perform various training techniques across both discriminator model 252 and generator model 250, such as back propagation and/or gradient descent, to train the models.

In other implementations, one or more recurrent neural networks or other memory networks (e.g., long short-term memory, or "LSTM") that are able to account for multi-temporal input may be used, e.g., by obstruction replacement engine 132, to generate replacement data that "fills in the gaps" as described in the summary. For example, in some implementations, each spatio-spectral "slice" of the 3D array structure described elsewhere herein (i.e., data extracted from each digital image of multiple digital images captured over time) may be applied as input across a recurrent neural network to generate output. This output may be combined (e.g., concatenated) with a "next" slice of the 3D array structure and applied, e.g., by obstruction replacement engine 132, as input across the same recurrent neural network to generate additional output. This may continue across a whole temporal sequence of digital images captured of a geographic area. At each turn, the output may "predict" what the next slice will look like. When the next slice in actuality includes transient obstruction(s) such as clouds, the predicted output can be used to generate replacement data for the obscured pixels.

Figure 4:
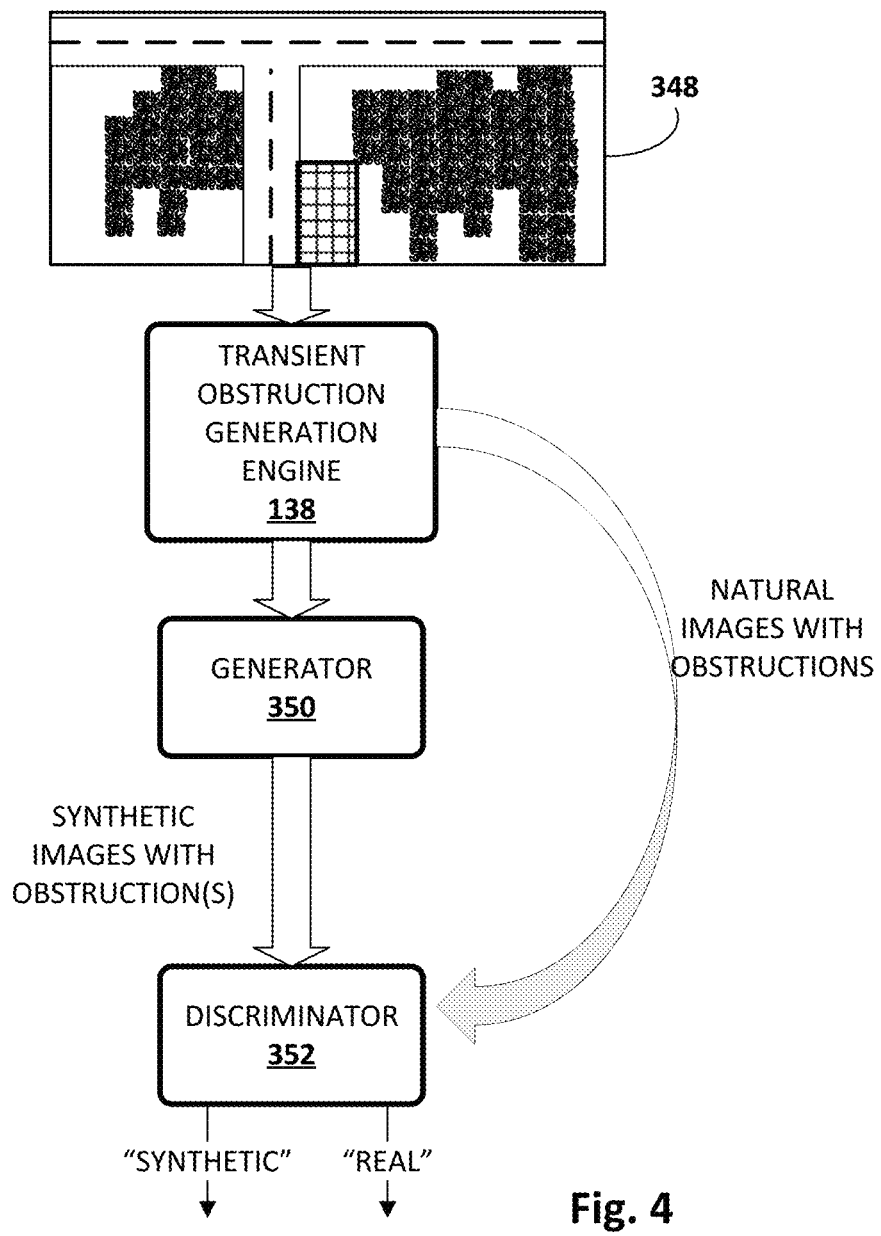
FIG. 4 depicts another example of how generative adversarial networks can be used to generate synthetic transient obstructions, e.g., for purposes of training various machine learning models described herein.

FIG. 4 schematically depicts an example of how GANs may be used to train one or more machine learning models employed by transient obstruction generation engine 138, in accordance with various implementations. Similar to FIG. 3, transient obstruction generation engine 138 may utilize a generator model 350 and a discriminator model 352, which may or may not take similar forms as models 250-252. In this example, transient obstruction generation engine 138 may retrieve one or more obstruction-free ground truth high-elevation digital images 348 and apply them as input across generator model 350 to generate synthetic images that include baked-in synthetic obstructions such as clouds. These synthetic images may then be applied as input across discriminator model 352, along with natural, ground truth images that also include obstructions. Similar to before, discriminator model 352 may be configured to generate output that constitutes a "guess" as to whether an input digital image is "synthetic" (e.g., generated by generator model 350) or "natural." These models 350-352 may be trained in a manner similar to that described above with regard to models 250-252.

Figure 5:
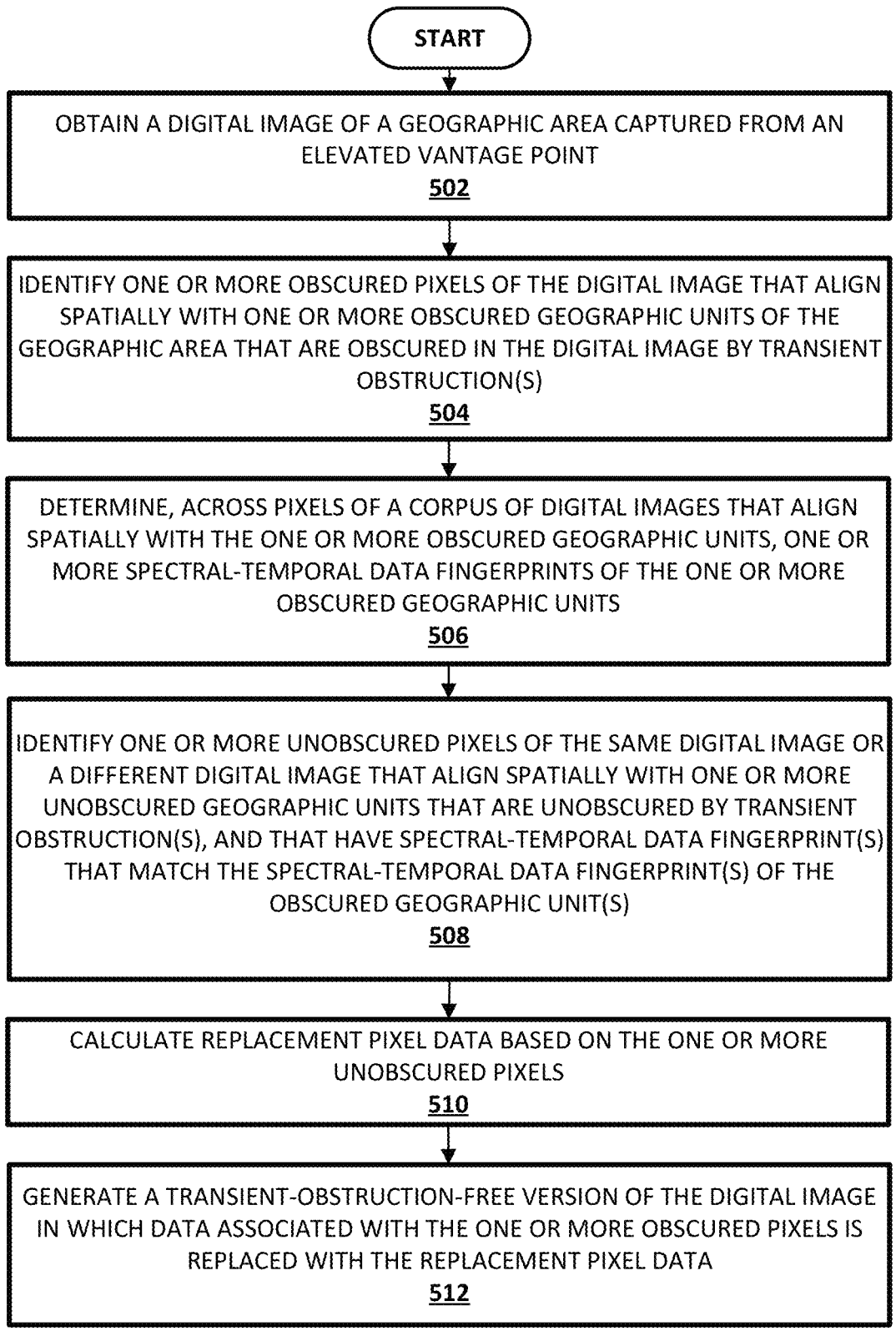
FIG. 5 depicts a flow chart illustrating an example method of practicing selected aspects of the present disclosure, in accordance with various implementations.

Referring now to FIG. 5, one example method 500 of performing selected aspects of the present disclosure is described. For convenience, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system may obtain a digital image of a geographic area captured from an elevated vantage point. In various implementations, the digital image may include a plurality of pixels that align spatially with a respective plurality of geographic units of the geographic area.

At block 504, the system, e.g., by way of transient obstruction detection engine 124, may identify one or more obscured pixels of the digital image that align spatially with one or more obscured geographic units of the geographic area that are obscured in the digital image by one or more transient obstructions. Put another way, pixels that depict a portion of a cloud or other transient obstruction are identified, e.g., by transient obstruction detection engine 124 using one or more techniques described previously.

At block 506, the system, e.g., by way of terrain classification engine 128, may determine, across pixels of a corpus of digital images that align spatially with the one or more obscured geographic units, one or more spectral-temporal data fingerprints of the one or more obscured geographic units. For example, in some implementations, a ("3D") array structure may have been assembled previously for the geographic area, e.g., based on multiple digital images captured of the geographic area. Each row of the 3D array may represent a particular pixel (and spatially corresponding geographic unit). Each column of the array may correspond to, for instance, a different digital image captured at a different time. Each unit in the third dimension of the 3D array may correspond to different spectral frequencies that are available in the digital images, such as red, green, blue, near infrared ("IR"), mid-IR, far-IR, thermal IR, microwave, and/or radar. In various implementations, this 3D array structure may be used at block 306 to determine domain fingerprints, such as spectral-temporal fingerprints, of individual geographic units.

At block 508, the system, e.g., by way of obstruction replacement engine 132, may identify one or more unobscured pixels of the same digital image or a different digital image that align spatially with one or more unobscured geographic units of the same or different geographic area that are unobscured by transient obstructions. In various implementations, the unobscured geographic units may have one or more spectral-temporal data fingerprints that match the one or more spectral-temporal data fingerprints of the one or more obscured geographic units that were determined at block 506.

At block 510, the system may calculate replacement pixel data based on the one or more unobscured pixels. For example, an average of values across the unobscured pixels within a particular spectrum, or across multiple spectra, may be used. Additionally or alternatively, in some implementations, a single pixel that is "closest" (e.g., has a most similar domain fingerprint) to the unobscured pixel may simply be cloned into the obscured pixel. At block 512, the system may generate a transient-obstruction-free version of the digital image in which data associated with the one or more obscured pixels is replaced with the replacement pixel data.

Figure 6:
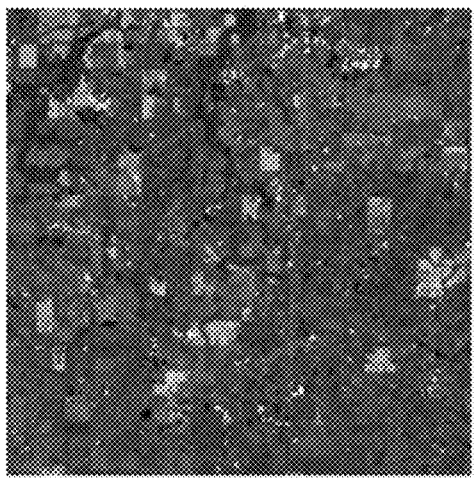
FIG. 6 depicts an example of how techniques described herein may be used to generate a transient-obstruction-free version of a high-elevation digital image that is at least partially obscured by transient obstruction(s).
Figure 6:
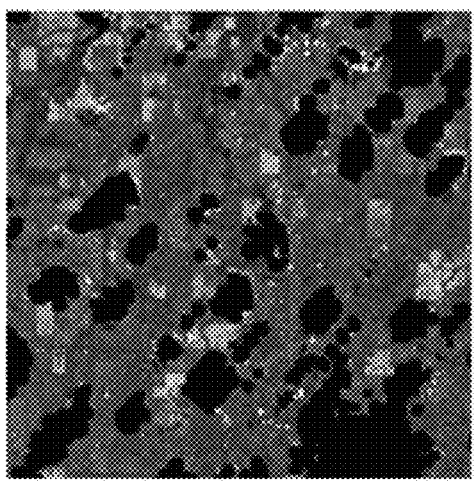
Figure 6:
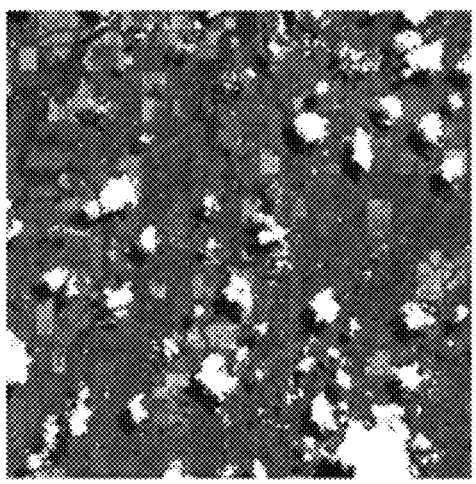

FIG. 6 depicts an example of how techniques described herein may be used to generate a transient-obstruction-free version of a high-elevation digital image. On the left, a digital image captured from a high elevation (e.g., a satellite) depicts a geographic area. It also can be seen that a number of clouds are positioned between the ground surface and the vantage point of the satellite, and therefore obstruct portions of the geographic area from view. In addition it can be seen the shadows cast by the clouds also obstruct additional portions of the geographic area.

In the middle image a cloud mask has been detected, e.g., by transient obstruction detection engine 124. The cloud mask has been used to remove obscured pixels that correspond to the clouds or their respective shadows. Put another way, the obscured pixels that align spatially with the geographic units that are obscured by the clouds or their respective shadows have been removed (e.g., values set to black, zeroed out, etc.). In the right image, the removed pixels have been replaced with replacement data generated using techniques described herein. As explained herein, this replacement data estimates the terrain underlying the obscured pixels.

FIGS. 7A-D schematically demonstrate another similar technique for performing transient obstruction removal. In FIGS. 7A-D (and in FIGS. 9A-D), the axes are meant to represent feature (e.g., green, blue, red, etc.) spaces, e.g., in latent space. In various implementations, the input for this transient obstruction removal technique may include: 1) a cloud free digital image; 2) a cloud-obstructed digital image; and 3) a cloud mask. The cloud mask may be computed, e.g., by transient obstruction detection engine 124, from the cloud-obstructed digital image using various techniques, such as those described herein.

Figure 7A:
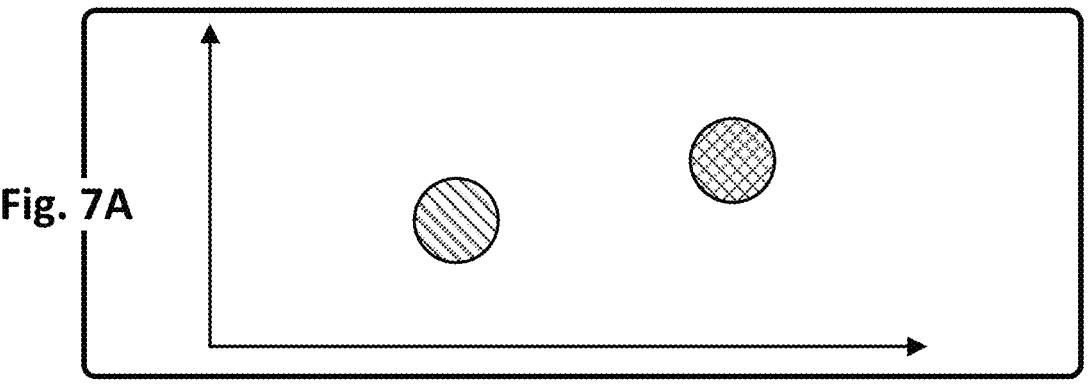
FIGS. 7A, 7B, 7C, and 7D schematically depict another technique for removing transient obstructions from high-elevation digital images, in accordance with various implementations.
Figure 7B:
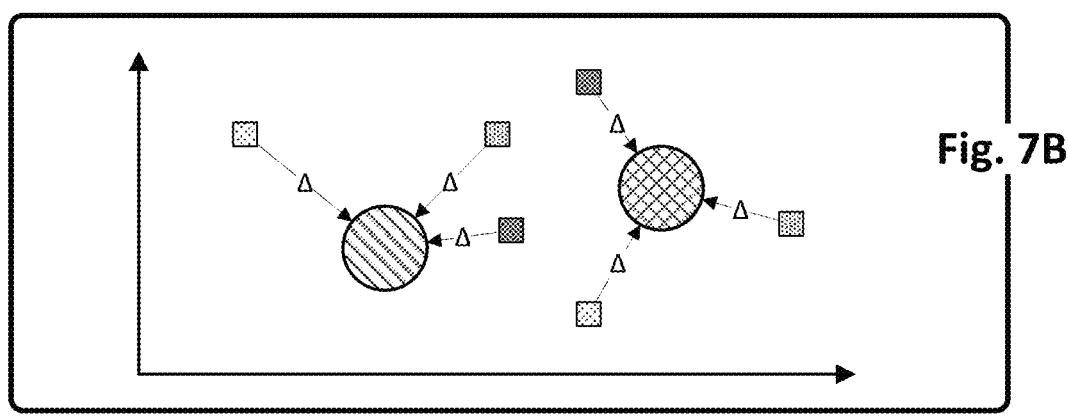

For the cloud free image, clustering may be performed, e.g., on all of the sub-bands of the image data. Various clustering techniques may be employed, such as K-means and/or other clustering techniques described herein. In some implementations, it is not required that the clusters be generated across a temporal sequence of high-elevation images, as was the case with some of the other transient obstruction-removal techniques described herein. Instead, clusters may be identified in a single cloud-free high-elevation digital image, and then those clusters may be used as described below to remove a transient obstruction from another high-elevation digital image that includes transient obstruction(s). The cluster centers (e.g., centroids) may be calculated, as depicted in FIG. 7A (which only depicts two cluster centers for the sake of brevity and clarity). In some implementations, these clusters may be classified, e.g., by terrain classification engine 128, as terrain types, e.g., using crop types from the CDL layer.

Figure 7C:
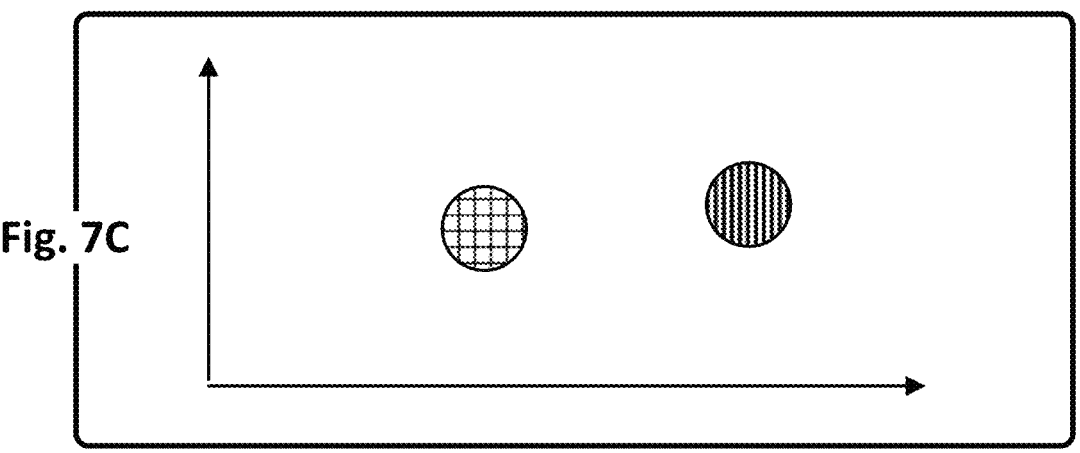
Figure 7D:
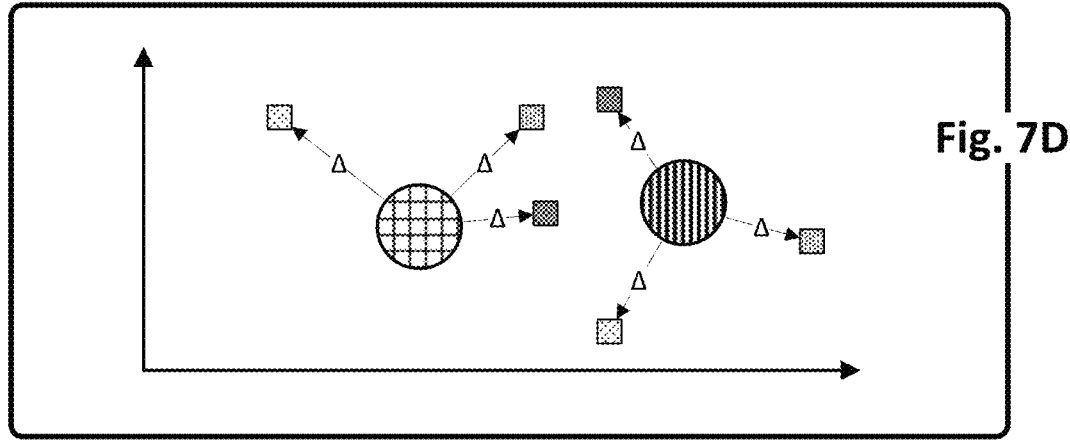

For the cloud-free high-elevation digital image, a distance or delta (Δ) may be computed from each individual pixel of the cluster to the centroid. This is demonstrated in FIG. 7B, in which three example pixels and their respective deltas from the pixel cluster centroid are depicted. These deltas may be preserved, e.g., in memory, for subsequent operations described below. Next, for the cloud-obstructed digital image and cloud mask, pixel clusters and their respective centroids may be computed for pixels that are unobstructed. Two examples of such unobstructed centroids are depicted in FIG. 7C. Finally, with the cloud-obstructed digital image and cloud mask, the values of the obstructed pixels in the cloud-obstructed digital image may be computed for each spectral sub-band. For example, and as shown in FIG. 7D, the values of the obstructed pixels in the cloud-obstructed digital image may be computed by offsetting the pixel cluster centroids computed as depicted in FIG. 7C by the deltas depicted in FIG. 7B.

In another aspect, and as noted previously, techniques are described herein for generating, e.g., by data fusion engine 142, synthetic high-elevation digital images by fusing data from multiple temporal sequences of high-elevation digital images, e.g., with disparate resolutions in the temporal, spatial, and/or spectral domains. For example, various data temporal sequences of high-elevation images acquired by MODIS (lower spatial resolution, higher temporal frequency) and the Sentinel-2 (higher spatial resolution, lower temporal frequency) systems may be fused to generate synthetic high-elevation digital images at spatial and/or spectral resolutions that approach or match those of the Sentinel-2 digital images.

In various implementations, a first temporal sequence of high-elevation digital images, e.g., acquired by MODIS or another airborne vehicle with relatively high temporal frequency, may be obtained, e.g., directly from the vehicle or from one or more databases that store high elevation digital images captured by the vehicle. The first temporal sequence of high-elevation digital images may capture a geographic area, such as one or more farms, at a first temporal frequency. Each high-elevation digital image of the first temporal sequence may include a plurality of pixels that align spatially with a respective first plurality of geographic units of the geographic area. The first plurality of geographic units may have a size that corresponds to a first spatial resolution of the individual pixels of the first temporal sequence.

Similarly, a second temporal sequence of high-elevation digital images, e.g., acquired by Sentinel-2 or another airborne vehicle, may be obtained, e.g., directly from the different vehicle or from one or more databases that store high elevation digital images captured by the different vehicle. Like the first temporal sequence, the second temporal sequence of high-elevation digital images capture the geographic area, except at a second temporal frequency that is less than the first temporal frequency, and at a second spatial resolution that is greater than the first spatial resolution. In various implementations, high-elevation digital images from the first and second temporal sequences may be registered (e.g., spatially aligned) on the same geographic area using a variety of techniques, such as various mathematical models for matching corresponding features on specific spectral sub-bands, Fourier methods, GPS metadata, mutual information, relaxation methods, and so forth. As with the first temporal sequence, each high-elevation digital image of the second temporal sequence may include a plurality of pixels that align spatially with a second plurality of geographic units of the geographic area (which due to the higher resolution of the pixels may be smaller than the first plurality of geographic units).

In various implementations, a mapping may be generated of the pixels of the high-elevation digital images of the second temporal sequence to respective sub-pixels of the first temporal sequence. The mapping may be based on spatial alignment of the geographic units of the second plurality of geographic units that underlie the pixels of the second temporal sequence with portions of the geographic units of the first plurality of geographic units that underlie the respective sub-pixels.

Figure 8:
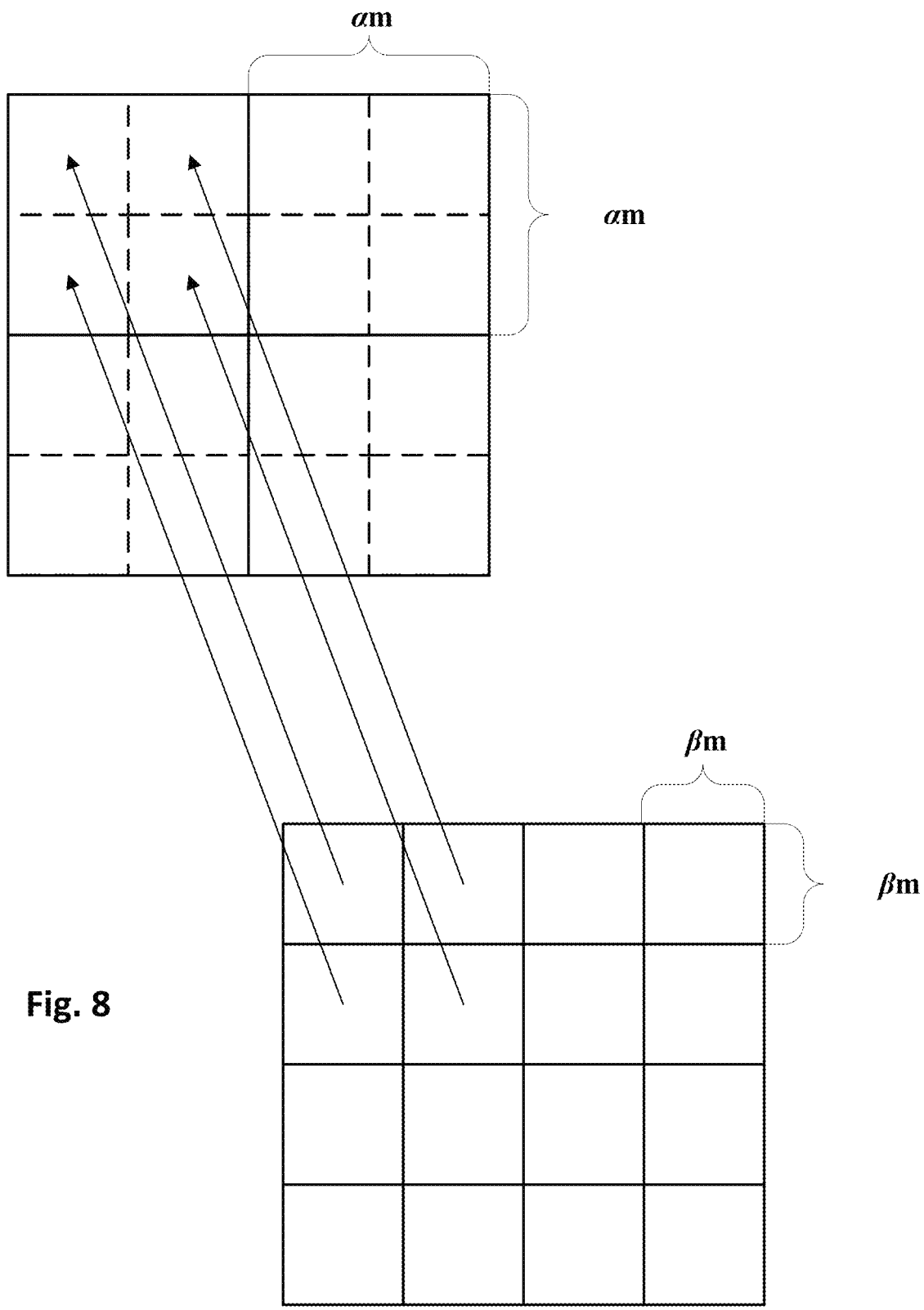
FIG. 8 schematically demonstrates an example mapping between high and low spatial resolution images.

An example of this mapping is demonstrated schematically in FIG. 8. At top, a two-by-two matrix of low-spatial resolution pixels (e.g., acquired by MODIS) is depicted in solid lines, and captures an underlying geographic area. For this example, assume that each pixel is $\alpha \times \alpha$ meters in size. At bottom, a four-by-four matrix of high-spatial-resolution pixels (e.g., acquired by Sentinel-2) is depicted in solid lines, and also capture the same geographic area. For this example, assume that each pixel of the bottom matrix is $\beta \times \beta$ meters in size. For the sake of simplicity, assume further that $\beta$ is half of $\alpha$. Thus, four pixels of the bottom matrix fit into one pixel of the top matrix. In various implementations, pixels of the top matrix (i.e., the first temporal sequence) may be subdivided into sub-pixels (shown in dashed lines) that correspond in size to pixels of the bottom matrix. Then, the bottom pixels may be mapped to the sub-pixels of the top matrix, as indicated by the arrows.

In some implementations, a next step may be to select a point in time for which a synthetic high-elevation digital image of the geographic area at the second spatial resolution will be generated. For example, a point in time at which no high-elevation digital image of the second temporal sequence, such as between two available images, may be selected, e.g., by a user operating crop prediction client 109 or another remote sensing application. A low-resolution reference digital image that was captured in closest temporal proximity to the point in time may also be selected from the first temporal sequence.

Then, in various implementations, a first deviation of ground-truth data forming the low-resolution reference digital image from corresponding data interpolated for the point in time from the first temporal sequence of high-elevation digital images may be determined. Based on the first deviation, a second deviation may be predicted of data forming the synthetic high-elevation digital image from corresponding data interpolated for the point in time from the second temporal sequence of high-elevation digital images. Then, the synthetic high-elevation digital image may be generated based on the mapping and the predicted second deviation.

This data fusion process is demonstrated schematically in FIGS. 9A-D. The input for the data fusion process includes satellite images from two sources: 1) high resolution low frequency (i.e., the second temporal sequence acquired, for example, by Sentinel-2); and 2) low resolution high frequency (i.e., the first temporal sequence acquired by, for instance, MODIS).

Figure 9A:
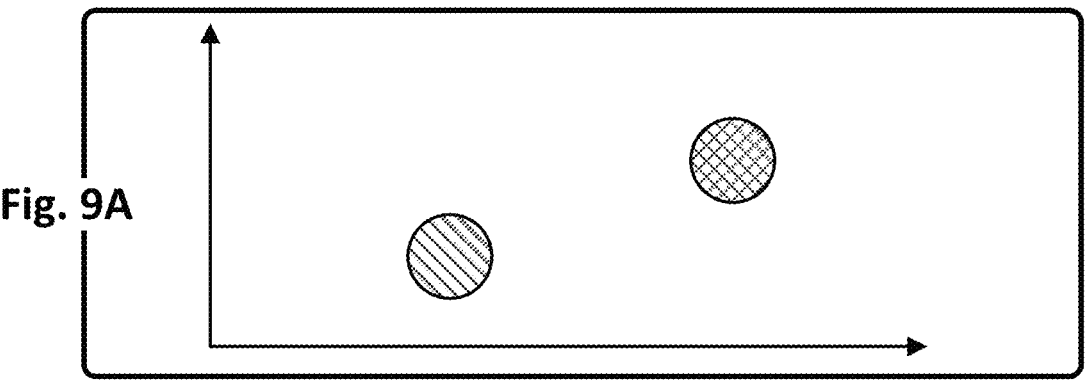
FIGS. 9A, 9B, 9C, and 9D schematically demonstrate a technique for fusing data from high-elevation digital images at different domain resolutions/frequencies to generate a synthetic high-elevation digital image.

FIG. 9A demonstrates a first step. For the high spatial resolution data (e.g., second temporal sequence acquired by Sentinel), cloud free high-elevation digital images across a time interval such as a crop year may be identified. Then clustering may be performed on one or more of the sub-bands of all the high-elevation digital images of the second temporal sequence to identify pixel clusters having comparable spectral-temporal traces. Centroids of the pixel clusters may be computed and recorded, as illustrated in FIG. 9A (which only depicts two cluster centroids for the sakes of brevity and clarity). In some cases these pixel clusters may be terrain classified, e.g., using CDL layer data for the classes. Notable, these clustering operations are different from those of FIGS. 7A-D (cloud removal) because temporal data is taken into account (i.e. spectral-temporal traces).

Figure 9B:
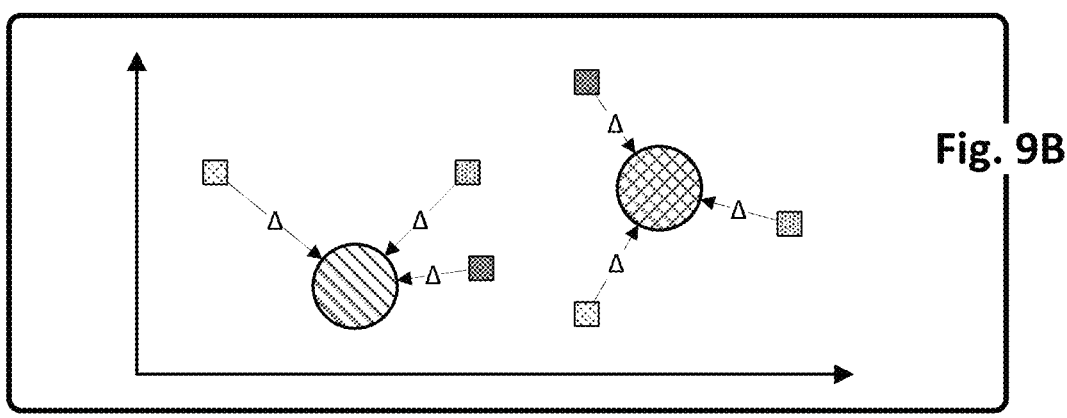

FIG. 9B demonstrates the next step, in which cloud-free digital images of the second temporal sequence are used to compute deltas ($\Delta$) from each pixel to a centroid of the pixel cluster of which they are members. These deltas may be preserved for future use. This operation may be similar to those described with regard to FIGS. 7A-D in many respects.

Figure 9C:
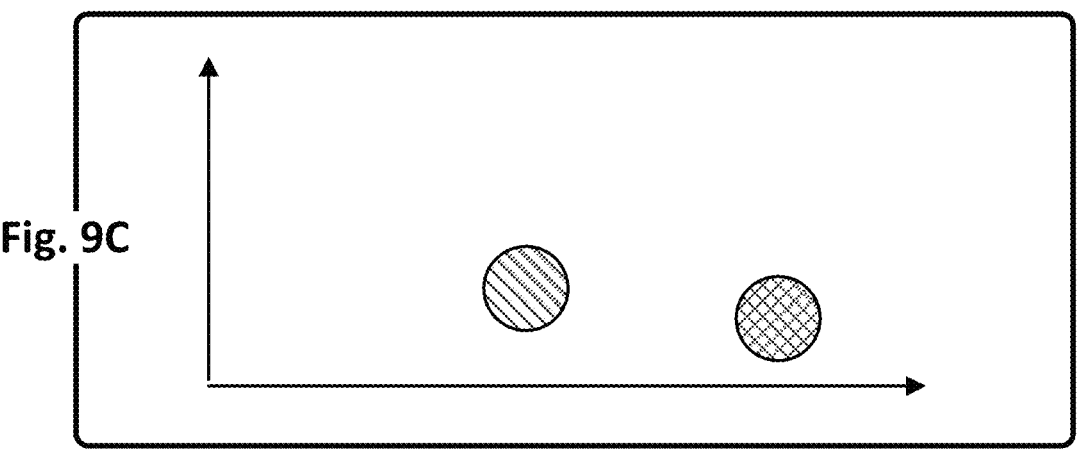

Next, and as demonstrated in FIG. 9C, for high-elevation digital images of the first temporal sequence (low spatial resolution, high temporal frequency, e.g., captured by MODIS) that are free of transient obstructions such as clouds, the pixel clusters may identified, similar to described above with respect to FIGS. 7A-D. Then, and as demonstrated in FIG. 9D, For the synthetic high-elevation digital image being computed (represented in FIG. 9D by the dark grey circle 966 in the center), its deviation (B in FIG. 9D) from an interpolated value 970 (e.g., linearly interpolated from first and second high-resolution anchor images 980A, 980B) is set to be proportionate to a deviation (A in FIG. 9D) of the temporally-corresponding low resolution image 968 (ground truth data from first temporal sequence) from an interpolated value 972 (e.g., interpolated from first and second low-resolution anchor images 982A, 982B).

Figure 10:
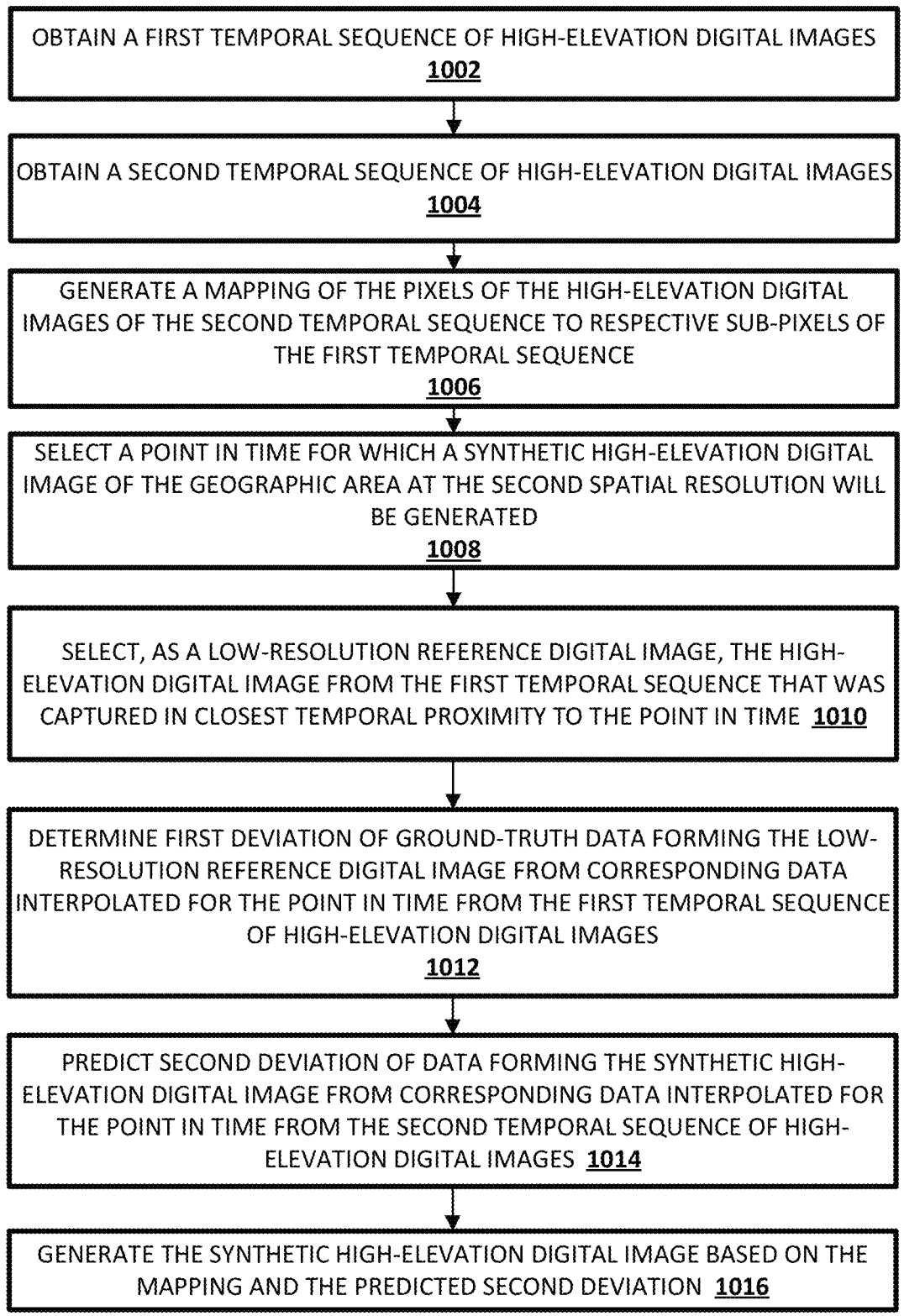
FIG. 10 depicts a flow chart illustrating an example method of practicing selected aspects of the present disclosure, in accordance with various implementations.

FIG. 10 illustrates a flowchart of an example method for practicing selected aspects of the present disclosure, including operations performed by data fusion engine 142. The steps of FIG. 10 can be performed by one or more processors, such as one or more processors described herein. Other implementations may include additional steps than those illustrated in FIG. 10, may perform step(s) of FIG. 10 in a different order and/or in parallel, and/or may omit one or more of the steps of FIG. 10. For convenience, the operations of FIG. 10 will be described as being performed by a system configured with selected aspects of the present disclosure.

At block 1002, the system may obtain a first temporal sequence of high-elevation digital images, e.g., from MODIS or another source of relatively high temporal frequency, low spatial/spectral resolution digital images. At block 1004, the system may obtain a second temporal sequence of high-elevation digital images, e.g., from Sentinel-2 or another source of relatively low temporal frequency but relatively high spatial/spectral resolution images.

At block 1006, the system may generate a mapping of the pixels of the high-elevation digital images of the second temporal sequence to respective sub-pixels of the first temporal sequence, e.g., as depicted in FIG. 8. In various implementations, the mapping may be based on spatial alignment of the geographic units of the second plurality of geographic units that underlie the pixels of the second temporal sequence with portions of the geographic units of the first plurality of geographic units that underlie the respective sub-pixels.

At block 1008, the system (e.g., based on user input) may select a point in time for which a synthetic high-elevation digital image of the geographic area at the second spatial resolution will be generated. For example, a point in time may be selected at which no Sentinel-2 image is available. At block 1010, the system may select, as a low-resolution reference digital image, the high-elevation digital image from the first temporal sequence that was captured in closest temporal proximity to the point in time.

Figure 9D:
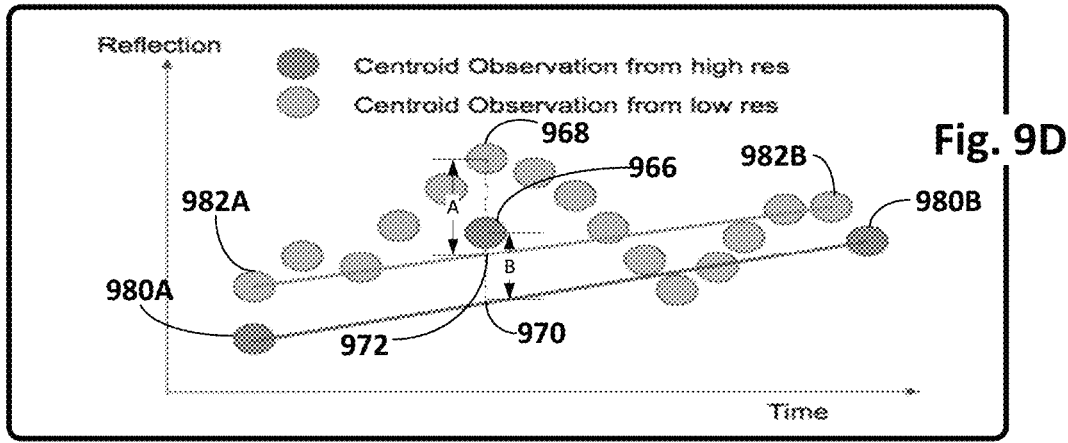

At block 1012, the system may determine a first deviation (e.g., A in FIG. 9D) of ground-truth data forming the low-resolution reference digital image from corresponding data interpolated (972) for the point in time from the first temporal sequence of high-elevation digital images, e.g., as depicted in FIG. 9D. For example, in some implementations, the system may select, as first and second low-resolution anchor digital images, two high-elevation digital images (e.g., 982A, 982B) from the first temporal sequence that were captured in closest temporal proximity to, respectively, high-elevation digital images (e.g., 980A, 980B) from the second temporal sequence that were acquired before, and after, respectively. In some implementations, these high-elevation digital images from the second temporal sequence may also be selected, e.g., as first and second high-resolution anchor digital images (980A, 980B). In some implementations, the corresponding interpolated data (972) calculated from the first temporal sequence of high-elevation images is calculated based on the first and second low-resolution anchor images (982A, 982B).

At block 1014, the system may predict, e.g., based on the first deviation determined at block 1012, a second deviation (e.g., B in FIG. 9D) of data forming the synthetic high-elevation digital image from corresponding data interpolated for the point in time from the second temporal sequence of high-elevation digital images. In some implementations, the corresponding interpolated data calculated for the point in time from the second temporal sequence may be calculated based on the first and second high-resolution anchor digital images (980A, 980B). For example, in some implementations, a plurality of pixel clusters may be identified across the high-elevation digital images of the second temporal sequence. Each pixel cluster of the plurality of pixel clusters may include pixels with comparable spectral-temporal traces across the second temporal sequence of high-elevation digital images. In some implementations, the corresponding data interpolated from the second temporal sequence may include one or more centroids calculated from one or more of the pixel clusters. And as noted previously, in some cases, deltas between each pixel and a centroid of a pixel cluster of which the pixel is a member may be stored and used to determine the pixel's final value in the synthetic high-elevation digital image.

At block 1016, the system may generate the synthetic high-elevation digital image based on the mapping and the predicted second deviation. In various implementations, the generating may include interpolating a spectral sub-band of the pixels of the synthetic high-elevation digital image that exists in the pixels of the second temporal sequence of high-elevation digital images, but is missing from the pixels of the first temporal sequence of high-elevation digital images. In some such implementations, the spectral sub-band missing from the pixels of the first temporal sequence of high-elevation digital images may be near infrared (which may be present in the second temporal sequence). Additionally or alternatively, in some implementations, the generating of block 1016 may be further based on a difference between a first elevation at which one or more digital images of the first temporal sequence was taken and a second elevation at which one or more digital images of the second temporal sequence was taken.

In addition to or instead of the techniques demonstrated by FIGS. 7A-D, 9A-D, and 10, in some implementations, other machine learning techniques may be employed to generate synthetic high-elevation digital images by fusing data from two or more temporal sequences of high-elevation digital images. For example, in some implementations, various deep learning techniques may be employed to facilitate "super-resolution" image processing. For example, in some implementations, deep convolutional neural networks may be trained using ground truth images to generate "enhanced" or "super-resolution" images. Additionally or alternatively, in some implementations, perceptual loss functions may be defined and/or optimized, e.g., based on high-level features extracted from pretrained networks.

Figure 11:
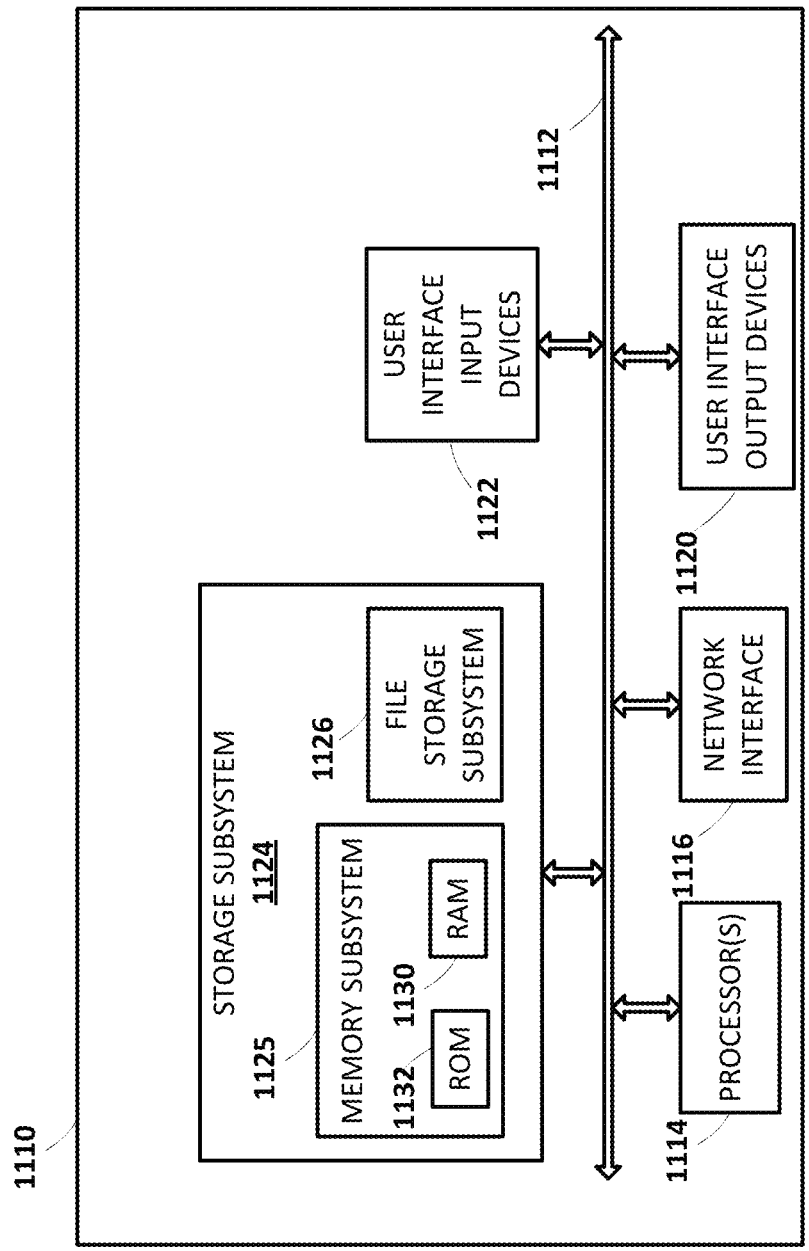
FIG. 11 schematically depicts an example architecture of a computer system.

FIG. 11 is a block diagram of an example computer system 1110. Computer system 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computer system 1110. Network interface subsystem 1116 provides an interface to outside networks and is coupled to corresponding interface devices in other computer systems.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1110 to the user or to another machine or computer system.

Storage subsystem 1124 stores programming and data constructs that provide the functionality of some or all of the modules described herein. For example, the storage subsystem 1124 may include the logic to perform selected aspects of the methods described herein, and/or to implement one or more components depicted in prior figures.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computer system 1110 communicate with each other as intended. Although bus subsystem 1112 is shown schematically as a single bus, alternative implementations of the bus subsystem may use multiple busses.

Computer system 1110 can be of varying types including a workstation, server, computing cluster, blade server, server farm, or any other data processing system or computing device. Due to the ever-changing nature of computers and networks, the description of computer system 1110 depicted in FIG. 11 is intended only as a specific example for purposes of illustrating some implementations. Many other configurations of computer system 1110 are possible having more or fewer components than the computer system depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    obtaining a first temporal sequence of high-elevation digital images,
        wherein the first temporal sequence of high-elevation digital images capture a geographic area at a first temporal frequency,
        wherein each high-elevation digital image of the first temporal sequence comprises a plurality of pixels that align spatially with a respective first plurality of geographic units of the geographic area, and
        wherein each high-elevation digital image of the first temporal sequence is captured at a first spatial resolution;
    obtaining a second temporal sequence of high-elevation digital images,
        wherein the second temporal sequence of high-elevation digital images capture the geographic area at a second temporal frequency that is less than the first temporal frequency,
        wherein each high-elevation digital image of the second temporal sequence comprises a plurality of pixels that align spatially with a second plurality of geographic units of the geographic area, and
        wherein each high-elevation digital image of the second temporal sequence is captured at a second spatial resolution that is greater than the first spatial resolution;
    generating a mapping of the pixels of the high-elevation digital images of the second temporal sequence to respective sub-pixels of the first temporal sequence, wherein the mapping is based on spatial alignment of the geographic units of the second plurality of geographic units that underlie the pixels of the second temporal sequence with portions of the geographic units of the first plurality of geographic units that underlie the respective sub-pixels;
    selecting a point in time for which a synthetic high-elevation digital image of the geographic area at the second spatial resolution will be generated;
    selecting, as a low-resolution reference digital image, the high-elevation digital image from the first temporal sequence that was captured in closest temporal proximity to the point in time;
    determining a first deviation of ground-truth data forming the low-resolution reference digital image from corresponding data interpolated for the point in time from the first temporal sequence of high-elevation digital images;
    predicting, based on the first deviation, a second deviation of data forming the synthetic high-elevation digital image from corresponding data interpolated for the point in time from the second temporal sequence of high-elevation digital images; and
    generating the synthetic high-elevation digital image based on the mapping and the predicted second deviation.

2. The method of claim 1, wherein the method further includes:
    identifying, across the high-elevation digital images of the second temporal sequence, a plurality of pixel clusters of the second temporal sequence, wherein each pixel cluster of the plurality of pixel clusters comprises pixels with comparable spectral-temporal traces across the second temporal sequence of high-elevation digital images;
    wherein the corresponding data interpolated from the second temporal sequence comprises one or more centroids calculated from one or more of the pixel clusters.

3. The method of claim 2, wherein the identifying includes performing K-means clustering on the pixels of the second temporal sequence of high-elevation digital images.

4. The method of claim 3, wherein each sub-band value of each synthetic pixel of the synthetic high-elevation digital image is calculated based on a deviation of that pixel from a centroid of a pixel cluster that contains that pixel.

5. The method of claim 1, wherein the second deviation is proportionate to the first deviation.

6. The method of claim 1, wherein the generating includes interpolating a spectral sub-band of the pixels of the synthetic high-elevation digital image, wherein the spectral sub-band exists in the pixels of the second temporal sequence of high-elevation digital images and is missing from the pixels of the first temporal sequence of high-elevation digital images.

7. The method of claim 6, wherein the spectral sub-band is near infrared.

8. The method of claim 1, wherein the generating is further based on a difference between a first elevation at which one or more digital images of the first temporal sequence was taken and a second elevation at which one or more digital images of the second temporal sequence was taken.

9. The method of claim 1, further comprising selecting, from the second temporal sequence, first and second high-resolution anchor digital images captured prior to and after, respectively, the point in time, wherein the corresponding data interpolated for the point in time from the second temporal sequence are calculated based on the first and second high-resolution anchor digital images.

10. The method of claim 9, further comprising selecting, as first and second low-resolution anchor digital images, the two high-elevation digital images from the first temporal sequence that were captured in closest temporal proximity to, respectively, the first and second high-resolution anchor digital images, wherein the corresponding data interpolated from the first temporal sequence of high-elevation digital images is calculated based on the first and second low-resolution anchor digital images.

11. The method of claim 1, wherein the first temporal sequence of high-elevation digital images is captured by a satellite.

12. The method of claim 11, wherein the second temporal sequence of high-elevation digital images is captured by a satellite.

13. The method of claim 11, wherein the second temporal sequence of high-elevation digital images is captured by an aerial drone.

14. A system comprising one or more processors and memory storing instructions that, in response to execution of the instructions by the one or more processors, cause the one or more processors to perform the following operations:
   obtaining a first temporal sequence of high-elevation digital images,
      wherein the first temporal sequence of high-elevation digital images capture a geographic area at a first temporal frequency,
      wherein each high-elevation digital image of the first temporal sequence comprises a plurality of pixels that align spatially with a respective first plurality of geographic units of the geographic area, and
      wherein each high-elevation digital image of the first temporal sequence is captured at a first spatial resolution;
   obtaining a second temporal sequence of high-elevation digital images,
      wherein the second temporal sequence of high-elevation digital images capture the geographic area at a second temporal frequency that is less than the first temporal frequency,
      wherein each high-elevation digital image of the second temporal sequence comprises a plurality of pixels that align spatially with a second plurality of geographic units of the geographic area, and
      wherein each high-elevation digital image of the second temporal sequence is captured at a second spatial resolution that is greater than the first spatial resolution;
   generating a mapping of the pixels of the high-elevation digital images of the second temporal sequence to respective sub-pixels of the first temporal sequence, wherein the mapping is based on spatial alignment of the geographic units of the second plurality of geographic units that underlie the pixels of the second temporal sequence with portions of the geographic units of the first plurality of geographic units that underlie the respective sub-pixels;
   selecting a point in time for which a synthetic high-elevation digital image of the geographic area at the second spatial resolution will be generated;
   selecting, as a low-resolution reference digital image, the high-elevation digital image from the first temporal sequence that was captured in closest temporal proximity to the point in time;
   determining a first deviation of ground-truth data forming the low-resolution reference digital image from corresponding data interpolated for the point in time from the first temporal sequence of high-elevation digital images;
   predicting, based on the first deviation, a second deviation of data forming the synthetic high-elevation digital image from corresponding data interpolated for the point in time from the second temporal sequence of high-elevation digital images; and
   generating the synthetic high-elevation digital image based on the mapping and the predicted second deviation.

15. The system of claim 14, further comprising instructions for:
   identifying, across the high-elevation digital images of the second temporal sequence, a plurality of pixel clusters of the second temporal sequence, wherein each pixel cluster of the plurality of pixel clusters comprises pixels with comparable spectral-temporal traces across the second temporal sequence of high-elevation digital images;
   wherein the corresponding data interpolated from the second temporal sequence comprises one or more centroids calculated from one or more of the pixel clusters.

16. The system of claim 15, wherein the identifying includes performing K-means clustering on the pixels of the second temporal sequence of high-elevation digital images.

17. The system of claim 15, wherein each sub-band value of each synthetic pixel of the synthetic high-elevation digital image is calculated based on a deviation of that pixel from a centroid of a pixel cluster that contains that pixel.

18. The system of claim 14, wherein the second deviation is proportionate to the first deviation.

19. The system of claim 14, wherein the generating includes interpolating a spectral sub-band of the pixels of the synthetic high-elevation digital image, wherein the spectral sub-band exists in the pixels of the second temporal sequence of high-elevation digital images and is missing from the pixels of the first temporal sequence of high-elevation digital images.

20. At least one non-transitory computer-readable medium comprising instructions that, in response to execution of the instructions by one or more processors, cause the one or more processors to perform the following operations:
   obtaining a first temporal sequence of high-elevation digital images,
      wherein the first temporal sequence of high-elevation digital images capture a geographic area at a first temporal frequency,
      wherein each high-elevation digital image of the first temporal sequence comprises a plurality of pixels that align spatially with a respective first plurality of geographic units of the geographic area, and
      wherein each high-elevation digital image of the first temporal sequence is captured at a first spatial resolution;
   obtaining a second temporal sequence of high-elevation digital images, wherein the second temporal sequence of high-elevation digital images capture the geographic area at a second temporal frequency that is less than the first temporal frequency, wherein each high-elevation digital image of the second temporal sequence comprises a plurality of pixels that align spatially with a second plurality of geographic units of the geographic area, and wherein each high-elevation digital image of the second temporal sequence is captured at a second spatial resolution that is greater than the first spatial resolution;

generating a mapping of the pixels of the high-elevation digital images of the second temporal sequence to respective sub-pixels of the first temporal sequence, wherein the mapping is based on spatial alignment of the geographic units of the second plurality of geographic units that underlie the pixels of the second temporal sequence with portions of the geographic units of the first plurality of geographic units that underlie the respective sub-pixels;

selecting a point in time for which a synthetic high-elevation digital image of the geographic area at the second spatial resolution will be generated;

selecting, as a low-resolution reference digital image, the high-elevation digital image from the first temporal sequence that was captured in closest temporal proximity to the point in time;

determining a first deviation of ground-truth data forming the low-resolution reference digital image from corresponding data interpolated for the point in time from the first temporal sequence of high-elevation digital images;

predicting, based on the first deviation, a second deviation of data forming the synthetic high-elevation digital image from corresponding data interpolated for the point in time from the second temporal sequence of high-elevation digital images; and generating the synthetic high-elevation digital image based on the mapping and the predicted second deviation.

* * * * *